United States Patent
Ohira et al.

(10) Patent No.: US 8,699,593 B2
(45) Date of Patent: Apr. 15, 2014

(54) COMMUNICATION MEDIUM DETERMINING APPARATUS AND METHOD OF DETERMINING COMMUNICATION MEDIUM

(75) Inventors: Yuki Ohira, Osaka (JP); Yosuke Matsushita, Osaka (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 13/203,734

(22) PCT Filed: Nov. 18, 2010

(86) PCT No.: PCT/JP2010/006755
§ 371 (c)(1),
(2), (4) Date: Aug. 29, 2011

(87) PCT Pub. No.: WO2011/061933
PCT Pub. Date: May 26, 2011

(65) Prior Publication Data
US 2011/0310991 A1    Dec. 22, 2011

(30) Foreign Application Priority Data
Nov. 18, 2009    (JP) .................................. 2009-263396

(51) Int. Cl.
*H04K 1/10*    (2006.01)

(52) U.S. Cl.
USPC ........... 375/260; 375/222; 375/224; 375/225; 370/419; 370/359

(58) Field of Classification Search
USPC .................. 375/260, 222, 224, 225; 370/359
See application file for complete search history.

(56) References Cited

U.S. PATENT DOCUMENTS

| | | | |
|---|---|---|---|
| 6,263,276 B1 * | 7/2001 | Yokoyama et al. | 701/420 |
| 7,602,799 B2 * | 10/2009 | Ikeda et al. | 370/419 |
| 7,876,815 B2 * | 1/2011 | Wang et al. | 375/222 |
| 2009/0190204 A1 | 7/2009 | Onaka et al. | |
| 2010/0195520 A1 | 8/2010 | Nakamura | |

FOREIGN PATENT DOCUMENTS

| | | |
|---|---|---|
| JP | 63-187983 | 8/1988 |
| JP | 2005-286751 | 10/2005 |
| JP | 4305244 | 7/2009 |
| JP | 2009-177587 | 8/2009 |
| JP | 2010-183220 | 8/2010 |

OTHER PUBLICATIONS

International Search Report issued Feb. 22, 2011 in International (PCT) Application No. PCT/JP2010/006755.

* cited by examiner

*Primary Examiner* — Eva Puente
(74) *Attorney, Agent, or Firm* — Wenderoth, Lind & Ponack, LLP.

(57) ABSTRACT

A communication medium determining apparatus determines a communication medium in use for communication between two devices on a network. The apparatus includes a communication performance obtaining unit which obtains values indicating transmission speeds in a given communication path when a device which decreases transmission speed in a specific communication medium when activated, is active and when the device is inactive. The apparatus further includes a communication medium determining unit which determines whether or not the communication through the given communication path is performed using the specific communication medium. This determination is based on a speed decrease value indicating a decrease amount of the transmission speed in the specific communication medium caused by activation of the device, and a speed difference value which is a difference in the transmission speed obtained by the communication performance obtaining unit between when the device is active and when the device is inactive.

12 Claims, 25 Drawing Sheets

Fig. 4

| Operative device | 2.4-GHz wireless transmission speed decrease value | Power line transmission speed decrease value |
|---|---|---|
| Recorder | 0 | 5 |
| Plasma display panel television | 0 | 15 |
| Microwave oven | 50 | 3 |
| Lighting apparatus | 0 | 8 |
| Carpet | 0 | 10 |

Fig. 5

| Devices communicating 602 | Measurement result 605 | Plasma display panel television | Microwave oven | Communication medium 604 |
|---|---|---|---|---|
| Router ⇔ recorder | 50 | OFF | OFF | Power line |
| | 50 | OFF | ON | |
| | 30 | ON | OFF | |
| Router ⇔ PC | 100 | OFF | OFF | Ethernet cable |
| | 100 | OFF | ON | |
| | 100 | ON | OFF | |
| Router ⇔ plasma display panel television | 90 | OFF | OFF | 2.4-GHz radio waves |
| | 40 | OFF | ON | |
| | 90 | ON | OFF | |

| Connected device | Address | Power line branch circuit |
|---|---|---|
| Recorder | 001 | Branch circuit 1 |
| Plasma display panel television | 002 | Branch circuit 1 |
| Microwave oven | 003 | Branch circuit 2 |
| Lighting apparatus | 004 | Branch circuit 1 |
| PC | 005 | Branch circuit 1 |
| Router | 006 | Branch circuit 1 |

Fig. 6B

| Connected device | Address | Location |
|---|---|---|
| Recorder | 001 | Room 1 |
| Plasma display panel television | 002 | Room 1 |
| Microwave oven | 003 | Room 2 |
| Lighting apparatus | 004 | Room 1 |
| PC | 005 | Room 1 |
| Router | 006 | Room 1 |

| Connected device | Address | Power line branch circuit | Connected device operation state |
|---|---|---|---|
| Recorder | 001 | Branch circuit 1 | ON |
| Plasma display panel television | 002 | Branch circuit 1 | OFF |
| Microwave oven | 003 | Branch circuit 2 | ON |
| Lighting apparatus | 004 | Branch circuit 1 | ON |
| PC | 005 | Branch circuit 1 | ON |
| Router | 006 | Branch circuit 1 | ON |

Fig. 20

| Connected device | Address | Power line branch circuit | Connected device operation state | Communication medium | Communication medium operation state |
|---|---|---|---|---|---|
| Plasma display panel television | 002 | Branch circuit 1 | OFF | N/A | N/A |
| PC | 005 | Branch circuit 1 | ON | 2.4-GHz radio waves | ON |
| Printer | 006 | Branch circuit 1 | ON | 2.4-GHz radio waves | ON |

COMMUNICATION MEDIUM DETERMINING APPARATUS AND METHOD OF DETERMINING COMMUNICATION MEDIUM

TECHNICAL FIELD

The present invention relates to a communication medium determining apparatus and a method of determining a communication medium in use for communication between devices communicating with each other.

BACKGROUND ART

In recent years, personal computers (hereinafter referred to as PCs) have been becoming more popular, and more and more recorders, such as digital versatile disc (DVD) recorders and hard disc recorders, and televisions are provided with a function of network connection. In addition, broadband connection services have been becoming less expensive. Such changes have been promoting the use of home networks.

Home networks are built using a variety of connection methods including not only a wired local area network (LAN) in which devices are interconnected using Ethernet (Ethernet is a registered trademark) cable but also new types of networks such as a wireless LAN and power line communication (hereinafter referred to as PLC) system, which allow connections of devices without introducing additional cables to home.

In such a communication environment, it may be impossible for users to have a network of desirable communication quality because the media have different transmission speeds and different sensitivities to interference of radio waves. Such differences are due to differences in properties among the communication media of the Ethernet connection, the wireless LAN, and the PLC system. Because not all the users of home networks are familiar with such network technologies, troubles in installation of devices on a network and network failures are often difficult for them to solve.

To solve the problems, it is desired that a communication status or a configuration of a home network can be easily identified at home or from a remote location. The remote location is, for example, a call center of a device manufacturer or a broadband connection service provider.

A conventional technique to solve the problems is disclosed in PTL 1. Specifically, PTL 1 discloses a technique in which bandwidths of communication between two devices on a network are measured when Transmission Control Protocol (TCP) packets are used and when User Datagram Protocol (UDP) packets are used, and presence of a wireless section between the two devices on the network is determined depending on whether or not the difference between the bandwidths exceeds a predetermined threshold.

CITATION LIST

Patent Literature

[PTL 1]
Japanese Patent No. 4305244

SUMMARY OF INVENTION

Technical Problem

However, in the conventional configuration disclosed in PTL 1, it is difficult to determine whether or not a PLC system is included in addition to a wireless LAN between two devices on a network in such an environment that may also include a PLC system.

This is because there is a tendency both in wireless LAN communication and in PLC that a bandwidth measured when UDP packets are used is larger than a bandwidth measured when TCP packets are used. It is therefore difficult in the conventional configuration to determine which of a wireless LAN and a PLC system is being used for communication when a PLC system may be involved in communication between two devices on a network.

In addition, determination of communication media using a difference between bandwidths according to PTL 1 requires time measurement to an accuracy of microsecond, which causes another problem that a timing device having such high accuracy is necessary.

The present invention, conceived to address the problems, has an object of providing a communication medium determining apparatus which determines a communication medium used for communication between two devices on a network and a method of determining a communication medium used for communication between two devices on a network.

Solution to Problem

In order to solve the problems with the conventional technique, the communication medium determining apparatus according to an aspect of the present invention determines a communication medium in use for communication through a given communication path, and includes: a communication performance obtaining unit configured to obtain (i) a value indicating a transmission speed in the given communication path when a device is active and (ii) a value indicating a transmission speed in the given communication path when the device is inactive, the device being a cause of decrease in transmission speed in a specific communication medium when the device is activated; and a communication medium determining unit configured to determine whether or not the communication through the given communication path is performed using the specific communication medium, based on (i) a speed decrease value indicating an amount of decrease in the transmission speed in the specific communication medium caused by activation of the device and (ii) a speed difference value which is a difference between the transmission speed obtained by the communication performance obtaining unit when the device is active and the transmission speed obtained when the device is inactive.

In this configuration, a communication medium included in a communication path between two devices on a network may be easily determined from a difference between a value indicating a transmission speed obtained when a device which causes decrease in the transmission speed upon its activation is active and a value indicating a transmission speed obtained when the device is inactive.

Advantageous Effects of Invention

According to the present invention, a communication medium in use for communication between two devices on a network is easily determined.

BRIEF DESCRIPTION OF DRAWINGS

FIG. 4 illustrates an example of an influence score table according to Embodiment 1.

FIG. 5 illustrates an example of a communication performance table according to Embodiment 1.

FIG. 6A illustrates an example of a connected device management table according to Embodiment 1.

FIG. 6B illustrates another example of the connected device management table according to Embodiment 1.

FIG. 17 illustrates an example of a connected device management table according to Embodiment 2.

FIG. 20 illustrates an example of a connected device management table according to Embodiment 3.

DESCRIPTION OF EMBODIMENTS

Figure 1:
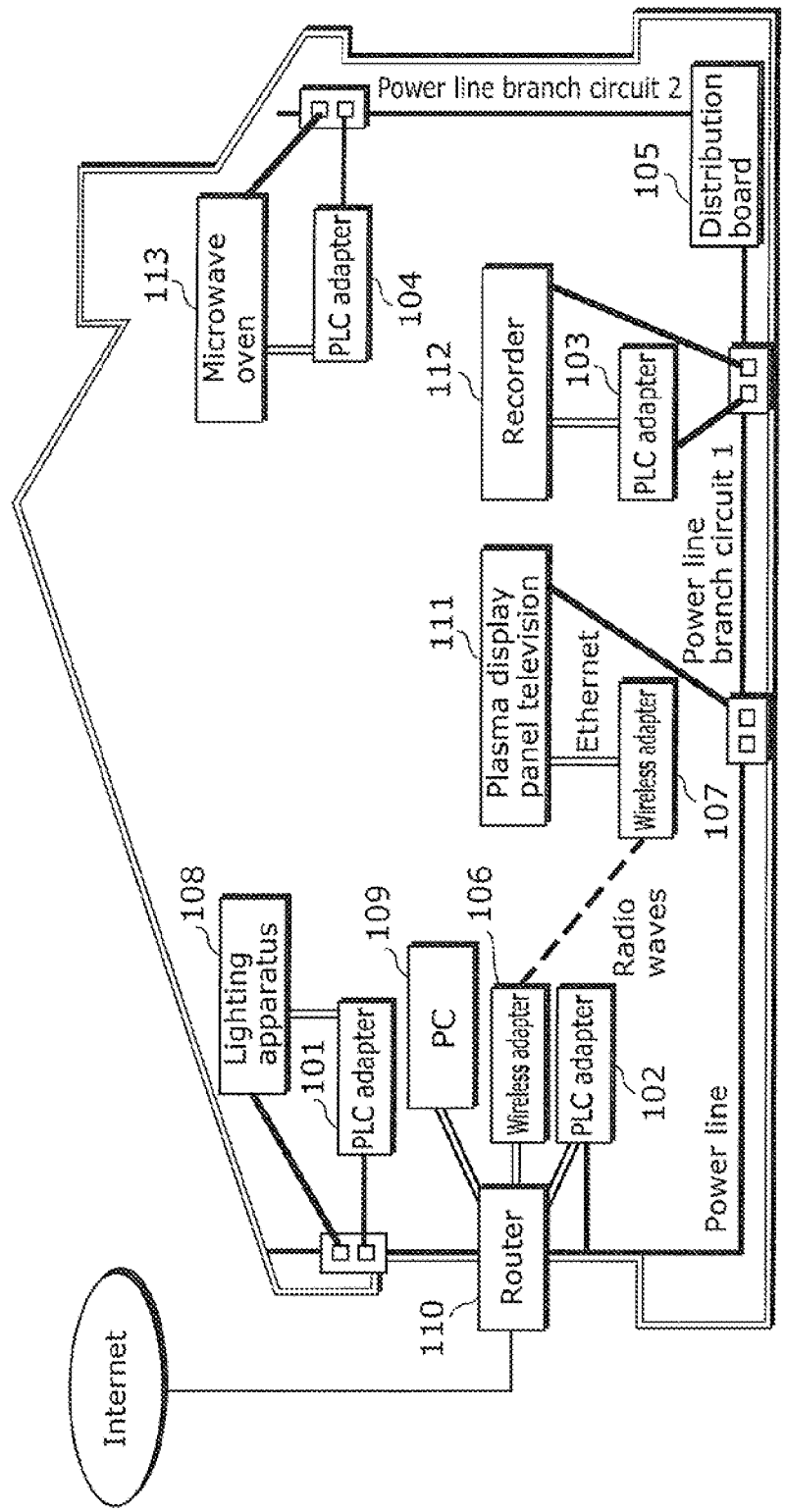
FIG. 1 illustrates a network configuration according to Embodiment 1.

The following describes embodiments of the present invention with reference to the drawings.

A communication medium determining apparatus according to an aspect of the present invention determines a communication medium in use for communication through a given communication path and includes: a communication performance obtaining unit configured to obtain (i) a value indicating a transmission speed in the given communication path when a device is active and (ii) a value indicating a transmission speed in the given communication path when the device is inactive, the device being a cause of decrease in transmission speed in a specific communication medium when the device is activated; and a communication medium determining unit configured to determine whether or not the communication through the given communication path is performed using the specific communication medium, based on (i) a speed decrease value indicating an amount of decrease in the transmission speed in the specific communication medium caused by activation of the device and (ii) a speed difference value which is a difference between the transmission speed obtained by the communication performance obtaining unit when the device is active and the transmission speed obtained when the device is inactive.

According to this aspect, whether or not communication through a given communication path is performed using a specific communication medium is determined based on (i) a speed decrease value indicating the amount of decrease in the transmission speed in the specific communication medium caused by activation of a device and (ii) a speed difference value which is a difference between a transmission speed obtained when the device is active and a transmission speed obtained when the device is inactive. In other words, a communication medium used in the given communication path may be determined based on the speed decrease value and the speed difference value even when the communication medium in use is radio waves for a wireless LAN or a power line for PLC. For example, it is possible to determine a communication medium used in a communication path even when a communication medium is changed to a power line at an adapter on the communication path. It is therefore possible to easily determine a communication medium used for communication even when a PLC system or wireless LANs using different frequency bands are used for communication between two devices on a network.

Furthermore, the communication medium determining apparatus preferably further includes a device control unit configured to issue an activation instruction or a deactivation instruction to the device, wherein the communication performance obtaining unit is configured to obtain the transmission speed when the device is active upon issuance of the activation instruction to the device by the device control unit, and configured to obtain the transmission speed when the device is inactive upon issuance of the deactivation instruction to the device by the device control unit.

According to this aspect, upon issuance of the activation instruction to the device, a value indicating a transmission speed is obtained when a device which causes decrease in the transmission speed in the specific communication medium is active. In addition, upon issuance of the deactivation instruction to the device, a value indicating a transmission speed is obtained when the device is inactive. Thus, an activation instruction and a deactivation instruction are issued to a device so that values indicating transmission speeds of a given communication path may be obtained when the device is active and when the device is inactive. In this configuration, a speed difference value is easily obtained, and thereby a communication medium through which the two devices on a network are communicating with each other may be easily determined.

Furthermore, the communication medium determining apparatus may further includes a monitoring unit configured to obtain an operation state indicating whether the device is active or inactive, wherein the communication performance obtaining unit is be configured to obtain the value indicating the transmission speed when the device is active or when the device is inactive, with reference to the operation state obtained by the monitoring unit.

According to this aspect, an operation state of a device which causes decrease in the transmission speed in a specific communication medium when the device is activated is obtained, and a value indicating a transmission speed in a given communication path is obtained when the device is active or when the device is inactive, with reference to the obtained operation state. In this configuration, a speed difference value is easily obtained without activating the device, and therefore a communication medium through which two devices on a network are communicating with each other may be easily determined based on the speed difference value.

Furthermore, the communication medium determining apparatus preferably further includes a storage unit in which identification information for identifying the device and the operation state of the device are stored in association with each other, wherein the monitoring unit is configured to store, in the storage unit, the obtained operation state of the device in association with the identification information of the device, and the communication performance obtaining unit is configured to obtain the value indicating the transmission speed, with reference to the operation state of the device stored in the storage unit.

According to this aspect, an operation state of a device which causes decrease in the transmission speed in a specific communication medium when the device is activated is stored in association with identification information of the device, and a value indicating a transmission speed in a communication path is obtained when the device is active or when the device is inactive, with reference to the stored operation state of the device. In this configuration, a speed difference value is easily obtained using the stored information without activating the device, and therefore a communication medium through which two devices on a network are communicating with each other may be easily determined based on the speed difference value.

Furthermore, the communication medium determining unit may be preferably configured to determine that the communication through the given communication path is performed using the specific communication medium, when the speed difference value is equal to or larger than the speed decrease value.

According to this aspect, when a speed difference value is equal to or larger than a speed decrease value, the communication medium determining unit determines that the communication through the given communication path is performed using the specific communication medium. In other words, a communication medium is determined by such an easy operation of comparing the speed difference value and the speed decrease value. In this configuration, a communication medium through which two devices on a network are communicating with each other may be easily obtained.

Furthermore, the communication performance obtaining unit is preferably configured to obtain the values indicating the transmission speeds for a first device preferentially selected from among devices including the device, each of the devices being a cause of decrease in the transmission speed in the specific communication medium when the device is activated, and the first device being a device for which the speed decrease value is relatively large, and the communication medium determining unit is preferably configured to determine whether or not the communication through the given communication path is performed using the specific communication medium, based on the speed decrease value for the first device and the speed difference value for the first device.

According to this aspect, a device for which a speed decrease value is relatively large is selected as a first device from among devices, and values indicating transmission speeds for the first device are obtained. Then, whether or not communication through a given communication path is performed using a specific communication medium is determined based on a speed decrease value and a speed difference value for the first device. In this configuration, a device having a relatively large influence for a communication medium may be preferentially selected by preferentially selecting a device for which a speed decrease value is relatively large for a communication medium. Therefore, accuracy of determination of a communication medium is increased.

Furthermore, the communication performance obtaining unit is preferably configured to obtain the values indicating the transmission speeds for a second device which is the device and causes decrease in the transmission speed only in the specific communication medium when the device is activated, and the communication medium determining unit is configured to determine whether or not the communication through the given communication path is performed using the specific communication medium, based on the speed decrease value for the second device and the speed difference value for the second device.

According to this aspect, values indicating transmission speeds for a second device, which causes decrease in the transmission speed only in a specific communication medium, are obtained. Then, whether or not communication through a given communication path is performed using a specific communication medium is determined based on a speed decrease value and a speed difference value for the second device. In this configuration, a device which causes decrease in transmission speed only in a specific communication medium is selected. Therefore, whether or not the specific communication medium is used may be determined with high accuracy through a single determination.

Furthermore, the communication performance obtaining unit is preferably configured to obtain the values indicating the transmission speeds for a third device which is the device and is connected to a power line of a same branch circuit as a power line included in the given communication path, and the communication medium determining unit is preferably configured to determine, based on the speed decrease value for the third device and the speed difference value for the third device, whether or not the communication through the given communication path is performed using a power line for power line communication, which is the specific communication medium.

According to this aspect, values indicating transmission speeds for a third device, which is connected to a power line of the same branch circuit as a power line included in a given communication path, are obtained. Then, whether or not communication through the given communication path is performed using a power line for PLC is determined based on a speed decrease value and a speed difference value for the third device. In this configuration, when whether or not a communication medium included in a given communication path is a power line is determined, a device having a large influence on PLC may be selected by selecting a device connected to a power line of the same branch circuit. For example, the power lines of the same branch circuit share the same circuit breaker. Therefore, whether or not a PLC system is used may be accurately determined.

Furthermore, the communication performance obtaining unit is preferably configured to obtain the values indicating the transmission speeds for a fourth device which is the device and is located in a space where radio waves in use for wireless communication through the given communication path are not blocked, and the communication medium determining unit is preferably configured to determine, based on the speed decrease value for the fourth device and the speed difference value for the fourth device, whether or not the communication through the given communication path is performed using a wireless communication network, which is the specific communication medium.

According to this aspect, values indicating transmission speeds for a fourth device, which is located in a space where radio waves in use for wireless communication through a given communication path are not blocked, are obtained. Then, whether or not communication through the given communication path is performed using a wireless communication network is determined based on a speed decrease value and a speed difference value for the fourth device. In this configuration, when whether or not a communication medium included in a given communication path is radio waves for a wireless LAN is determined, a device which has a large influence on a wireless LAN may be selected by selecting a device located in a space where radio waves are not blocked. Therefore, whether or not a wireless LAN is used may be accurately determined.

Furthermore, the communication performance obtaining unit is preferably configured to obtain at least one of the values indicating the transmission speeds, by performing a measurement in communication through the given communication path or by receiving from another device which has performed communication through the given communication path.

According to this aspect, a device may obtain a value indicating a transmission speed by performing a measurement for itself in communication through a given communication path or may obtain a value indicating a transmission speed from another device which has performed communication through the given communication path. In this configuration, the device may obtain a value indicating a transmission speed by performing a measurement for itself, and may obtain a value indicating the transmission speed from another device when the device does not measure a value indicating a transmission speed for the device itself.

Furthermore, the present invention may be implemented not only as such a communication medium determining apparatus but also as a method including the processes performed by the processing units of the communication medium determining apparatus as steps. The present invention may be implemented also as a program which causes a computer to perform the characteristic processes included in the method. It should be understood that the program may be distributed via a storage medium such as a CD-ROM or a transmission medium such as the Internet. Furthermore, the present invention may be implemented as an integrated circuit including processing units which function as characteristic processing units of the communication medium determining apparatus.

The communication medium determining apparatuses and the method of determining a communication medium are applicable to a variety of network. The following describes, as specific examples, a network including a PLC system in which a power line is used as a communication medium and a network including a wireless LAN in which radio waves in the 2.4-GHz frequency band are used. It is to be noted that all or part of the embodiments below are also applicable to networks of different types, such as a 900-MHz wireless LAN.

In the present description, communication media referring to a wireless LAN include not only media in use for communication but also frequency bands in use for communication. This is because causes of troubles vary depending on frequency bands in use. Thus, determining not only that a communication medium is radio waves but also a frequency band in use will allow more appropriate trouble shooting.

Embodiment 1

FIG. 1 illustrates a configuration of a network according to Embodiment 1 of the present invention.

As shown in FIG. 1, the network according to Embodiment 1 includes PLC adapters 101 to 104, a distribution board 105, wireless adapters 106 and 107, lighting apparatus 108, a PC 109, a router 110, a plasma display panel television 111, a recorder 112, and a microwave oven 113. Each of the PLC adapters is connected through alternate-current electrical power outlet to a power line which serves as a communication medium. The wireless adapters 106 and 107 are connected to a wireless network which provides another communication medium, that is, a wireless LAN.

The PLC adapters 101 to 104 communicate data such as video data or control data to and from each other through the power line serving as a communication medium.

The wireless adapters 106 and 107 communicate data such as video data or control data to and from each other via 2.4-GHz radio waves serving as communication media.

The router 110 is connected to the wireless adapter 106, the PLC adapter 102, and the PC 109 to communicate data such as video data or control data through Ethernet cables serving as communication media, and also connected to the Internet.

The PLC adapters 101 to 104 and the wireless adapters 106 and 107 are connected to home electric devices via the Ethernet cables. When the home electric devices communicate with each other, the one which transmits data based on a determination that the Ethernet cables are used for the communication of data by the home electric devices.

However, data signals transmitted through the wireless LAN or the PLC system attenuate by distance or are influenced by noise after medium conversion from the Ethernet cables into the power line for PLC or into 2.4-GHz radio waves by the adapters as shown in Embodiment 1. This may cause discontinuities in video data, which are not found in communication using Ethernet cables. In this case, the devices communicating with each other know the communication medium which the device directly uses but not the fact that communication media are changed by the adapter on the network path. It is therefore impossible for the transmitting device or the receiving device to identify a cause of such discontinuities in video data.

In the method according to Embodiment 1, a cause of discontinuities in video data is identified on the basis of determination of a communication medium between adapters through which the devices communicate with each other. It is assumed that the connected devices are capable of exchange control signals with each other through the router 110.

In the following description, the router 110 is a communication medium determining apparatus which determines communication media for communication through a given communication path. Embodiment 1 is illustrated by the following example in which the router 110 determines communication media in use for communication between the router 110 and the recorder 112.

Figure 2:
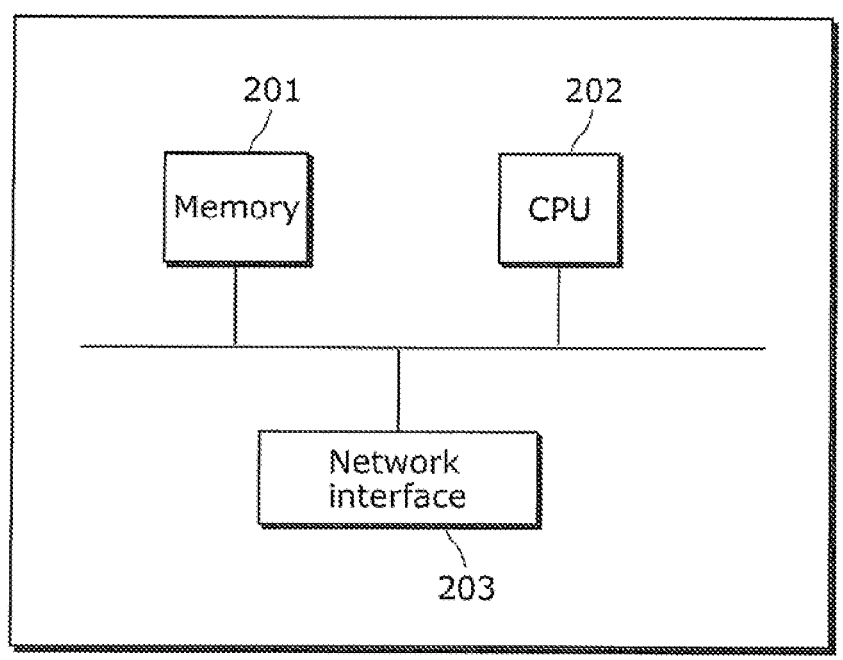
FIG. 2 illustrates a hardware configuration of each of the home electric devices according to Embodiment 1.

FIG. 2 illustrates a hardware configuration of each of the home electric devices according to Embodiment 1.

In FIG. 2, each of the home electric devices includes a memory 201, a central processing unit (CPU) 202, and a network interface 203. The memory 201 stores control programs and includes a work area. The CPU 202 controls the whole device. The network interface 203 communicates data through an Ethernet network.

Each of the home electric devices executes the programs stored in the memory 201 by the CPU 202, transmits data through the network interface 203, and decodes data received through the network interface 203 by the CPU 202.

Figure 3:
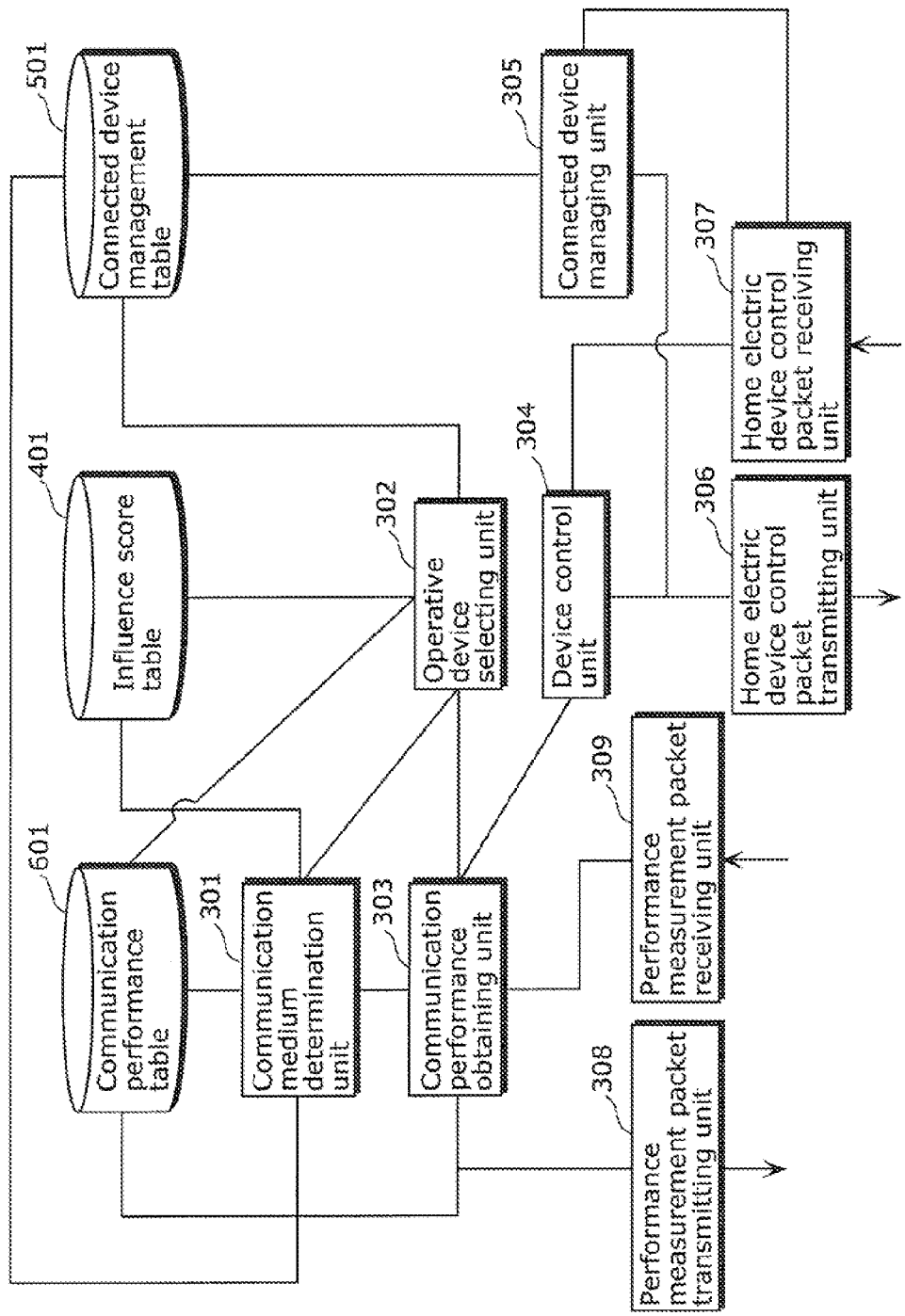
FIG. 3 is a block diagram illustrating a functional configuration of a router which is a communication medium determining apparatus according to Embodiment 1.

FIG. 3 shows a block diagram illustrating a functional configuration of the router 110 which functions as a communication medium determining apparatus according to Embodiment 1. Specifically, FIG. 3 is a functional block diagram illustrating functions performed by the CPU 202 of the router 110.

As shown in FIG. 3, the router 110 which functions as the communication medium determining apparatus includes a communication medium determining unit 301, an operative device selecting unit 302, a communication performance obtaining unit 303, a device control unit 304, a connected device managing unit 305, a home electric device control packet transmitting unit 306, a home electric device control packet receiving unit 307, a performance measurement packet transmitting unit 308, and a performance measurement packet receiving unit 309.

The memory 201 of the router 110 stores an influence score table 401, a connected device management table 501, and a communication performance table 601.

The communication medium determining unit 301 determines whether or not communication through a given communication path is performed using a specific communication medium, based on a speed decrease value included in the influence score table 401 and a speed difference value included in the communication performance table 601. The speed difference value indicates a difference in transmission speed. Specifically, when the speed difference value is equal to or larger than the speed decrease value, the communication medium determining unit 301 determines that the communication through the communication path is performed using the specific communication medium.

The speed decrease value indicates the amount of decrease in transmission speed in a specific communication medium caused by activation of an operative device. The speed difference value indicates a difference in transmission speed in a given communication path between when the operative device is active and when the operative device is inactive. The transmission speed is measured by the communication performance obtaining unit 303. The operative device is a device which causes a decrease in transmission speed in a specific communication medium when activated.

Specifically, the communication medium determining unit 301 sends a request to determine a communication medium between devices communicating with each other to the operative device selecting unit 302. Receiving notification that measurement of communication performance has been completed from the communication performance obtaining unit 303, the communication medium determining unit 301 determines the communication medium between the devices communicating with each other with reference to the influence score table 401 and the communication performance table 601 which includes the result of the measurement.

The influence score table 401 and the communication performance table 601 are described below. Firstly, an explanation is given of the influence score table 401.

FIG. 4 illustrates an example of the influence score table 401 according to Embodiment 1 of the present invention.

As shown in FIG. 4, the influence score table 401 contains speed decrease values 404 which represent levels of noise given to the respective communication media 403 from operative devices 402 when they are active.

The operative devices 402 are devices which are connected on the network and generate noise when they are active. The communication media 403 are types of communication media. The speed decrease values 404 indicate levels of noise given to the respective communication media 403 by the operative devices 402. Specifically, the speed decrease values 404 represent the amounts of decrease in transmission speed in the communication media 403 caused by activation of the operative devices 402.

The speed decrease values may be determined as factory-set values or obtained by connecting the devices to the Internet. The speed decrease values 404 may indicate the amounts of signal attenuation (the amount of decrease in transmission speed) occurring in the communication medium 403 when the operative devices 402 are activated, the amounts of decrease in the bandwidth of a path, or delays in communication.

In the example shown in FIG. 4, the speed decrease values 405 indicate the amounts of signal attenuation between the devices communicating with each other through a communication medium of 2.4-GHz radio waves due to noise generated by the operative devices 402. The speed decrease values 406 indicate the amounts of signal attenuation due to noise generated by the operative devices 402 between the devices communicating with each other through a communication medium of a power line for PLC.

A method of determining a communication medium using the influence score table 401 is illustrated by the following example in which a communication medium from the router 110 to the recorder 112 is determined.

In the example, the router 110 is referred to as the communication medium determining apparatus, and the recorder 112 is referred to as a communication medium determination destination device. In the measurement of communication performance from the router 110 to the recorder 112 with the plasma display panel television 111 listed as one of the operative devices 402, communication performance between the router 110 and the recorder 112 is measured when the plasma display panel television 111 is generating noise (that is, the plasma display panel television 111 is active) and when the plasma display panel television 111 is not generating noise (that is, the plasma display panel television 111 is inactive).

In the case where the difference in the performance of communication to the recorder 112 between when the plasma display panel television 111 is generating noise and when the plasma display panel television 111 is not generating noise is larger than 15 shown in the influence score table 401 as the speed decrease value 407 of the PLC used with a recorder, it is determined that there is a PLC section between the router 110 and the recorder 112 on the network. That is, it is determined that a power line is used as a communication medium.

The speed decrease values 404 shown in FIG. 4 may be predetermined by a user or updated as necessary when a device is additionally listed as an operative device 402 or when arrangement of the devices is changed. The speed decrease values 404 shown in FIG. 4 are for illustrative purposes only and not limited to the values therein.

In addition, the plasma display panel television is in FIG. 4 for illustrative purposes only and a liquid crystal display television may be used instead, which gives a smaller speed decrease value. The network may include not only one plasma display panel television or one lighting apparatus but two or more of them. In this case, speed decrease values are provided for each of the two or more plasma display panel televisions or the lighting apparatuses.

Next, an explanation is given of the communication performance table 601.

FIG. 5 illustrates an example of the communication performance table 601 according to Embodiment 1.

The communication performance table 601 may be stored only while communication performance is being measured and discarded when the measurement is completed, or may be kept after the measurement. The communication performance table 601 is a collection of information which lists devices communicating 602, operative devices 603, communication media 604, measurement results 605, and operation states 606.

The devices communicating 602 show pairs of the communication medium determining apparatus (the router 110) and the communication medium determination destination device (the recorder 112 or the device shown therein). The operative devices 603 show operative devices each selected, by the operative device selecting unit 302, as necessary for determination of a communication medium to the communication medium determination destination device.

In the list of the communication media 604, communication media determined by the communication medium determining unit 301 using results of performance measurement performed by the communication performance obtaining unit 303. In the list of the measurement results 605, values indicating transmission speeds obtained by the communication performance obtaining unit 303 as results of the measurement of communication performance. The operation states 606 indicate operation states of each of the operative devices during the measurement of communication performance. Specifically, the operation states 606 indicate the operation states by ON and OFF.

With reference to FIG. 5, in the case where the communication medium determination destination device is a recorder, there is no difference in measured communication performance between when a microwave oven is ON and when the microwave oven is OFF. In contrast to this, there is a difference of 20 in communication performance between when a plasma display panel television is ON and when the plasma display panel television is OFF. On the other hand, according to the influence score table 401, for the plasma display panel television as an operative device 402, there is no influence on the communication medium 403 of 2.4-GHz radio waves and there is an influence indicated by a speed decrease value 406 of 15 when the communication medium 403 is a power line. Thus, the speed difference value, which is the actually measured difference in communication performance, is larger than the speed decrease value in the influence score table 401. It is therefore determined that a communication path between the router and the recorder includes a section where a power line for PLC is used as a communication medium. Here, the communication performance is a value indicating, for example, a transmission speed.

In the same manner, in the case where the communication medium determination destination device is a PC, there is no difference in actually measured communication performance between when one of the plasma display panel television and the microwave oven are ON and when both of them are OFF. It is therefore determined that the communication medium between the router and the PC is an Ethernet cable.

In the case where the communication medium determination destination device is a plasma display panel television, there is a difference of 50 in communication performance between when the microwave oven is ON and when the microwave oven is OFF. Then, according to the influence score table 401, for the microwave oven as operative device 402, there is no influence on the communication medium 403 of a power line and there is an influence indicated by the speed decrease value of 50 when the communication medium 403 is 2.4-GHz radio waves. It is therefore determined that a communication path between the router and the plasma display panel television includes a section where 2.4-GHz radio waves are used as a communication medium.

An entry of "Not available" may be included in the measurement results 605 because measurement of communication performance is usually impossible while a plasma display panel television is OFF. However, it is to be noted that communication performance may be measured even when a plasma display panel television is OFF if communication with the communication interface of the plasma display panel television is available without turning the plasma display panel television ON. The values of measurement results 605 shown in FIG. 6 are for illustrative purposes only and not limited to them. It is also to be noted that communication medium determination source devices need to be listed in the communication performance table 601 in addition to the communication medium determination destination devices in the case where the device which measures communication performance and the device which determines a communication medium are different and both have no influence on communication performance.

Referring to FIG. 3 again, the operative device selecting unit 302 has a function of selecting, with reference to the connected device management table 501 and the influence score table 401 stored in the memory 201, devices to be caused to generate noise necessary for determination of a communication medium, and then storing a list of the selected devices to be caused to generate noise in the communication performance table 601 stored in the memory 201. In addition, after selecting the devices to be caused to generate noise for measurement of transmission speed and preparing the communication performance table 601, the operative device selecting unit 302 notifies the communication performance obtaining unit 303 that the communication performance table 601 is ready.

FIG. 6A illustrates an example of the connected device management table 501 according to Embodiment 1.

The connected device management table 501 is a collection of information which lists devices currently on the network and information on the devices. The connected device management table 501 may be combined with the influence score table 401.

The connected devices 502 are devices connected to the communication medium determining apparatus. The addresses 503 are the addresses of the connected devices 502. The power line branch circuits 505 are branch circuits of power lines to which the respective connected device 502 are connected. The connected device management table 501 is generated by the connected device managing unit 305. The connected device managing unit 305 will be described later.

The operative device selecting unit 302 selects, from the devices listed in the connected device management table 501, a device having the highest influence score for each of the communication media 403 in the influence score table 401. In the case of the influence score table 401 shown in FIG. 4, for example, the operative device selecting unit 302 selects the microwave oven as a device having an influence on a wireless LAN, and the plasma display panel television as a device having an influence on a PLC network.

It is to be noted that the difference in communication performance shown in the influence score table 401 occurs in a PLC network only when the device selected as an operative device is provided with power from an outlet connected to the same circuit breaker. Thus, in the case of a PLC network, the operative device selecting unit 302 selects, from the connected devices 502 having the same entry in the power line branch circuits 505, a device having the highest influence score for the PLC network according to the influence score table 401 so that the accuracy of determination is increased.

It is to be noted that the connected device management table 501 shown in FIG. 6A may be predetermined by a user or updated as necessary when a device is additionally listed as a connected device 502 or when arrangement of the connected devices is changed. In addition, the plasma display panel television is in FIG. 4 for illustrative purposes only and a liquid crystal display television may be used instead, and the network may include not only one plasma display panel television or one lighting apparatus but two or more of them.

The connected device management table 501a shown in FIG. 6B may be used instead of the connected device management table 501.

FIG. 6B illustrates another example of the connected device management table according to Embodiment 1.

The locations 505a indicate where the respective connected devices 502 are located. It is to be noted that the difference in communication performance shown in the influence score table 401 occurs in a wireless LAN only when the device selected as an operative device is located in a space where radio waves are not blocked during wireless communication. Thus, in the case of a wireless LAN, the operative device selecting unit 302 selects, from the connected devices 502 in the same one of the locations 505a, a device having the highest influence score for the wireless LAN according to the influence score table 401 so that the accuracy of determination is increased.

Referring to FIG. 3 again, the communication performance obtaining unit 303 obtains (i) a value indicating a transmission speed in a given communication path when a device is active and (ii) a value indicating a transmission speed in the given communication path when the device is inactive. The device causes decrease in transmission speed in a specific communication medium when the device is activated. Specifically, upon issuance of an activation instruction to an operative device by the device control unit 304, the communication performance obtaining unit 303 obtains a value indicating a transmission speed when the operative device is active, and upon issuance of a deactivation instruction to the operative device by the device control unit 304, the communication performance obtaining unit 303 obtains a value indicating a transmission speed when the operative device is inactive.

More specifically, the communication performance obtaining unit 303 has a function of measuring communication performance and starts measurement of communication performance upon receiving a notification from the operative device selecting unit 302 that the communication performance table 601 is ready. The communication performance obtaining unit 303 notifies the device control unit 304 of an operative device to be activated or deactivated and the operation state of the operative device so that noise necessary for the measurement of communication performance is generated for the purpose of determination of a communication medium.

Upon receiving a notification of completion of setting of the operative device and the operation state of the operative device from the device control unit 304, the communication performance obtaining unit 303 requests the performance measurement packet transmitting unit 308 to transmit a communication performance measurement packet. Then, the communication performance obtaining unit 303 receives the communication performance measurement packet indicating the measured communication performance from the performance measurement packet receiving unit 309 and enters the result of the measurement of the communication performance in the list of the measurement results 605 in the communication performance table 601 stored in the memory 201.

The communication performance obtaining unit 303 repeats the above process to measure communication performance when each of the operative devices is generating noise and when not generating noise. When communication performance is measured for all the operative devices in both operation states, the communication performance obtaining unit 303 notifies the communication medium determining unit 301 of completion of the measurement of the communication performance. Communication performance may be measured without using a communication performance measurement packet.

When information on available operative devices is stored in the memory 201, the device control unit 304 selects a device with reference to the information. When no information on available operative devices is stored, the device control unit 304 specifies a type of a device and issues an activation instruction or an inactivation instruction to an operative device of the specified type.

Specifically, the device control unit 304 has a function of issuing an activation instruction to an operative device so that noise necessary for determination of a communication medium is generated. For example, the device control unit 304 causes the communication medium determining apparatus to generate noise when the communication medium determining apparatus is selected as an operative device. Upon receiving a notification of an operative device and an operation state thereof from the communication performance obtaining unit 303, the device control unit 304 generates a home electric device control packet and requests the home electric device control packet transmitting unit 306 to send the home electric device control packet in order to cause the operative device to generate noise.

Then, upon receiving, from the home electric device control packet receiving unit 307, a home electric device control packet returned from the operative device which has received the instruction to generate noise and including a response to an operation request, the device control unit 304 notifies the communication performance obtaining unit 303 of completion of setting of the operative device and the operation state thereof.

When the operative device indicated in a notification from the communication performance obtaining unit 303 is the communication medium determining apparatus, the device control unit 304 places the operation communication medium determining apparatus in the operation state indicated in the notification from the communication performance obtaining unit 303. In addition, upon receiving a home electric device control packet requesting change of the operation state from the home electric device control packet receiving unit 307, the device control unit 304 changes the operation state of the device which has received the home electric device control packet according thereto.

Figure 7:
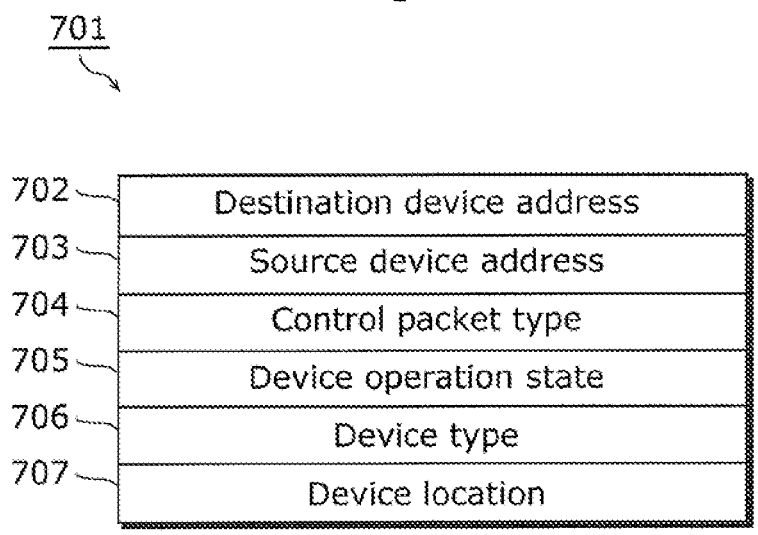
FIG. 7 illustrates a data format of a home electric device control packet according to Embodiment 1.

The following describes a format of the home electric device control packet with reference to FIG. 7.

FIG. 7 illustrates a data format of the home electric device control packet according to Embodiment 1 flowing across the network for control of a device.

As shown in FIG. 7, the home electric device control packet 701 includes the fields of destination device address 702, source device address 703, control packet type 704, device operation state 705, device type 706, and device location 707.

The destination device address 702 indicates the address of the communication medium determination destination device to which the home electric device control packet is delivered.

The source device address 703 indicates the address of a device which is the source of the home electric device control packet.

The control packet type 704 indicates the type of the home electric device control packet. Specifically, the control packet type 704 is set in the following manner: "1" for an operation request which is a request to change the operation state of a communication medium determination destination device; "2" for a response to an operation request; "3" for a request for notification of the operation state from a communication medium determination destination device; and "4" for a notification of operation state.

The device operation state 705 indicates the operation state of the device. Specifically, when the control packet type 704 is "1", the device operation state 705 is set to "1" for a request to turn ON a device and "2" for a request to turning OFF a device. When the control packet type 704 is "2", the device operation state 705 is set to 1 when the operation state of the device after receiving an operation request is ON, and "2" when OFF. When the control packet type 704 is "4", the device operation state 705 is set to "1" when the operation state of the device at the time of generation of the home electric device control packet is ON, and "2" when OFF.

The fields of the device type 706 and the device location 707 are used when the control packet type 704 is "4". The device type 706 indicates the type of the communication medium determination destination device, and the device location 707 indicates the location of the communication medium determination destination device in a house. The location may be indicated either by a distance from the center of the house or by a specific room where the device is located. The device location 707 may indicate a branch circuit of power lines which share a circuit breaker on a distribution board. Alternatively, the device location 707 may indicate a location obtained by a GPS.

Referring to FIG. 3 again, the connected device managing unit 305 has a function of generating a home electric device control.

packet for a notification of its own operation state to the other devices on the network to request the home electric device control packet transmitting unit 306 to transmit the generated home electric device control packet, and a function of managing the operation states of the other devices on the network.

Specifically, upon receiving, from the home electric device control packet receiving unit 307, a home electric device control packet having a control packet type of "3", the connected device managing unit 305 generates a home electric device control packet 701 having a control packet type of "4" and requests the home electric device control packet transmitting unit 306 to transmit the generated home electric device control packet in order to notify the source device of the received home electric device control packet of its own operation state. On the other hand, upon receiving a home electric device control packet having a control packet type of "4" from the home electric device control packet receiving unit 307, the connected device managing unit 305 enters the content of the packet in the connected device management table 501 stored in the memory 201.

The home electric device control packet transmitting unit 306 transmits home electric device control packets according to requests to transmit sent from the device control unit 304 or the connected device managing unit 305.

The home electric device control packet receiving unit 307 has a function of transferring a home electric device control packet received from the other device to the device control unit 304 or the connected device managing unit 305. Specifically, upon receiving a home electric device control packet having a control packet type of "1" or "2", the home electric device control packet receiving unit 307 transfers the home electric device control packet to the device control unit 304. Upon receiving a home electric device control packet having a control packet type of "3" or "4", the home electric device control packet receiving unit 307 transfers the home electric device control packet to the connected device managing unit 305.

The performance measurement packet transmitting unit 308 transmits a performance measurement packet upon receiving, from the communication performance obtaining unit 303, a request to transmit a performance measurement packet for measurement of communication performance.

The performance measurement packet receiving unit 309 notifies the communication performance obtaining unit 303 of the result of measurement upon receiving a performance measurement packet for measurement of communication performance.

The following describes internal control of each of the devices with reference to FIG. 8 to FIG. 14. In the following, it is assumed that each of the devices includes the functions of the communication medium determining apparatus shown in FIG. 3. However, the device which does not determine a communication medium may not include all of the functions of the communication medium determining apparatus but only the functions necessary for the process described below.

Figure 8:
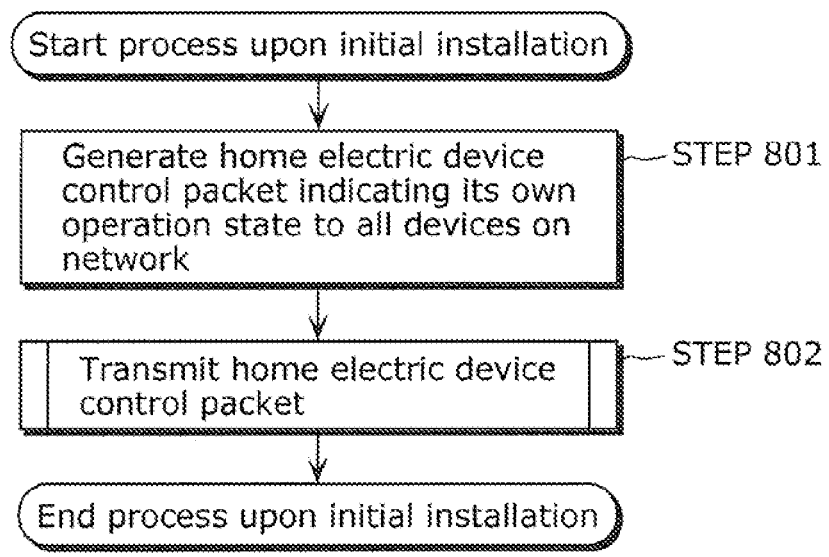
FIG. 8 is a flowchart illustrating an example of a process to be performed upon the initial installation according to Embodiment 1.

FIG. 8 is a flowchart illustrating a process to be performed upon the initial installation of each of the devices according to Embodiment 1.

First, in STEP 801, the connected device managing unit 305 notifies all the other devices on the network of its own entry in the network, and generates a home electric device control packet 701 indicating its own operation state in order to cause the other devices to add the device including the connected device managing unit 305 in each own connected device management table 501. Specifically, the connected device managing unit 305 generates a home electric device control packet 701 having the addresses of all the other devices in the destination device address 702, its own address in the source device address 703, and the control packet type set to "4", and then requests the home electric device control packet transmitting unit 306 to transmit the generated home electric device control packet 701.

Next, in STEP 802, the connected device managing unit 305 sets a value of each of the fields of the home electric device control packet 701, and transmits the home electric device control packet via the home electric device control packet transmitting unit 306. The transmission of the home electric device control packet will be detailed below with reference to FIG. 12.

The process above is performed upon the initial installation of each of the devices.

Figure 9:
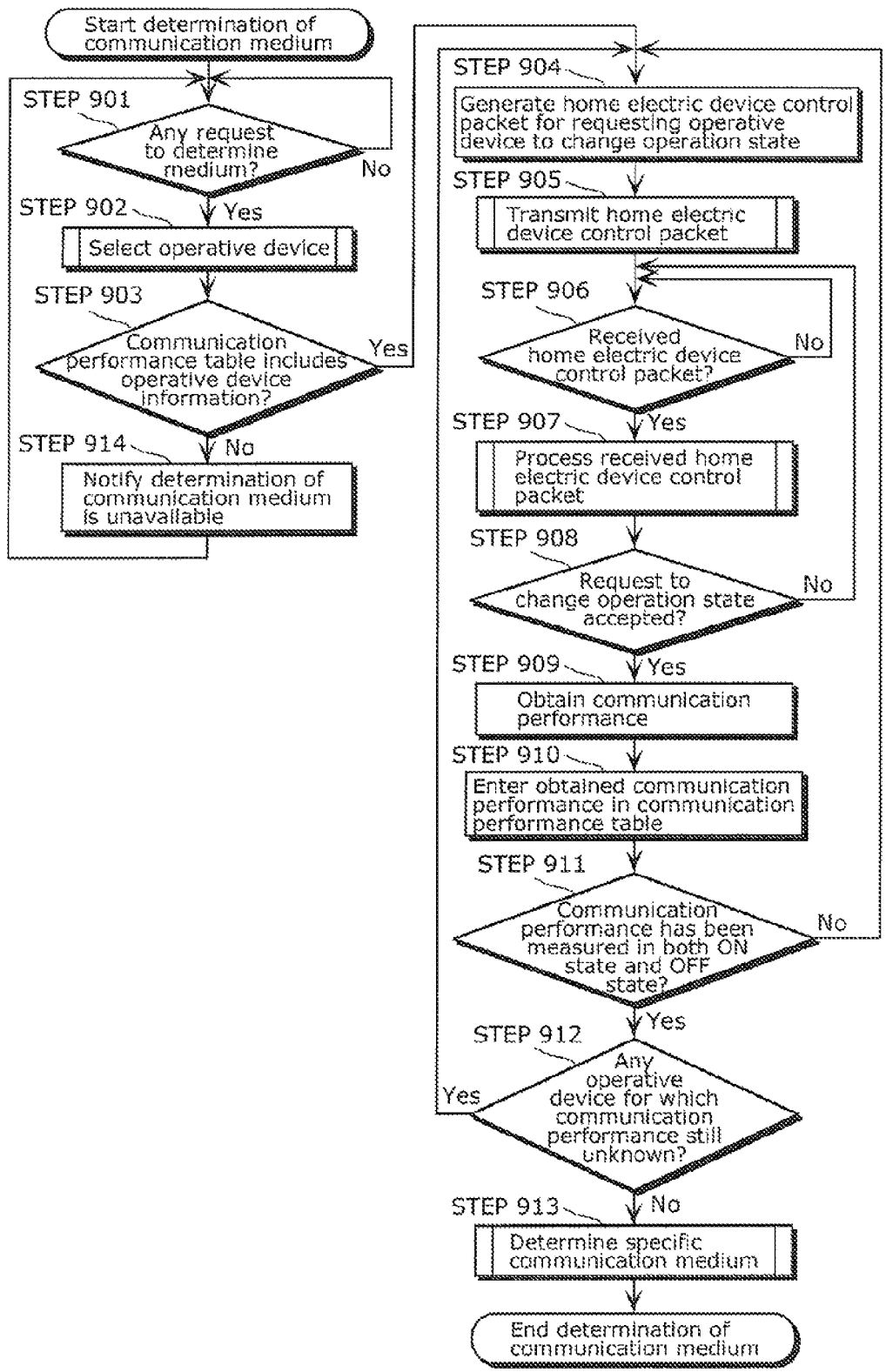
FIG. 9 is a flowchart illustrating an example of a process through which the communication medium determining apparatus according to Embodiment 1 determines a communication medium.

FIG. 9 is a flowchart illustrating a process through which the communication medium determining apparatus requested to determine a communication medium determines a communication medium according to Embodiment 1. In Embodiment 1, it is assumed that the communication medium determining apparatus is the router 110.

First, in STEP 901, the router 110 determines whether or not there is a request to determine a medium. When the router 110 determines that there is a request to determine a medium (Yes in STEP 901), the process proceeds to STEP 902. On the other hand, when the router 110 determines that there is not a request to determine a medium (No in STEP 901), the router 110 repeats STEP 901 until a request to determine a medium is received.

Next, in STEP 902, the operative device selecting unit 302 selects an operative device which is caused to generate noise for the determination of a communication medium, and enters the selected operative device in the communication performance table 601. The selection of an operative device will be detailed later with reference to FIG. 10A and FIG. 10B.

Next, in STEP 903, the communication medium determining unit 301 determines whether or not any operative device is included in the communication performance table 601 in STEP S902. When the communication medium determining unit 301 determines that an operative device is included in the communication performance table 601 (Yes in STEP 903), the process proceeds to STEP 904. On the other hand, when the communication medium determining unit 301 determines that no operative device is included in the communication performance table 601 (No in STEP 903), the process proceeds to STEP 914. In STEP 914, the communication medium determining unit 301 notifies the device requesting to determine a communication medium that the determination of a communication medium is unavailable.

In STEP 904, the device control unit 304 selects, from among the operative devices 603 listed in the communication performance table 601, an operative device for which communication performance has not been measured at least for one of the two operation states indicated by the operation states 606, that is, the ON state and the OFF state, and generates a home electric device control packet 701 for an operation request to be issued to the selected operative device.

Then, the device control unit 304 sets the destination device address 702 of the generated home electric device control packet 701 to the address of the selected operative device and the source device address 703 of the generated home electric device control packet 701 to the address of the communication medium determining apparatus. In addition, the device control unit 304 sets the control packet type 704 of the generated home electric device control packet 701 to "1" so that the home electric device control packet 701 indicates an operation request. In addition, the device control unit 304 sets the device operation state 705 of the home electric device control packet 701 so that the device operation state 705 indicates the one of the ON state and the OFF state of the operative device for which communication performance has not been measured.

Next, in STEP 905, the device control unit 304 transmits the home electric device control packet via the home electric device control packet transmitting unit 306. The transmission of the home electric device control packet will be detailed below with reference to FIG. 12.

Next, in STEP 906, the device control unit 304 waits for a home electric device control packet in return from the device which has received the home electric device control packet indicating the operation request. Here, the device control unit 304 may re-send the same home electric device control packet. When the device control unit 304 has no response after sending the home electric device control packet several times, the device control unit 304 determines that the selected operative device is not available, and, as necessary, selects another operative device having influence on a communication medium.

Next, in STEP 907, the device control unit 304 performs a process on the received home electric device control packet. In STEP 908, the device control unit 304 determines whether or not the operation request has been accepted. The process to be performed on the received home electric device control packet will be detailed below with reference to FIG. 13.

Next, in STEP 908, the device control unit 304 determines whether or not the device control unit 304 has received a home electric device control packet indicating that the operation request has been accepted When the device control unit 304 determines that the device control unit 304 has not received the home electric device control packet (No in STEP 908), the process returns to STEP 906 and waits for an incoming packet in response to the operation request. When the device control unit 304 determines that the device control unit 304 has received a home electric device control packet indicating acceptance of the operation request (Yes in STEP 908), the process proceeds to STEP 909.

In STEP 909, the communication performance obtaining unit 303 obtains communication performance by measuring communication performance of a communication medium to be determined through which the devices are communicating with each other. The communication performance obtaining unit 303 may obtain a value indicating a transmission speed by performing a measurement in communication through a given communication path or may obtain a value indicating a transmission speed from another device which has had a communication through the given communication path.

Next, in STEP 910, the communication performance obtaining unit 303 enters the measurement result in the measurement result 605 in the communication performance table 601.

Next, in STEP 911, the communication performance obtaining unit 303 determines whether or not the communication performance table 601 includes measurement results for both of the ON state and the OFF state of the operative device selected in STEP 904.

When the communication performance obtaining unit 303 determines that the communication performance table 601 includes measurement results for both of the ON state and the OFF state of the operative device selected in STEP 904 (Yes in STEP 911), the process proceeds to STEP 912.

On the other hand, when the communication performance obtaining unit 303 determines that the communication performance table 601 lacks a measurement result for one of the ON state and the OFF state of the operative device selected in STEP 904 (No in STEP 911), the process returns to STEP 904. In STEP 904, the communication performance is measured when the selected operative device is in the one of the ON state and the OFF state in which communication performance has not been measured.

In STEP 912, the communication performance obtaining unit 303 determines whether or not communication performance is still unknown for any of the operative devices 603 listed in the communication performance table 601.

When the communication performance obtaining unit 303 determines that communication performance is still unknown for any of the operative devices 603 (Yes in STEP 912), the process returns to STEP 904. In STEP 904, the device control unit 304 selects another device for which communication performance has not been measured in the ON state or the OFF state, and generates a home electric device control packet to be transmitted to the selected operative device.

On the other hand, when the communication performance obtaining unit 303 determines that communication performance has been measured for all of the operative devices 603 (No in STEP 912), the process proceeds to STEP 913. In STEP 913, the communication medium determining unit 301 determines a specific communication medium. The determination of a specific communication medium will be detailed below with reference to FIG. 14.

Thus, a communication medium is determined.

Alternatively, the process may skip STEP 903 and STEP 914 and proceed to STEP 904 immediately after STEP 902.

Figure 10A:
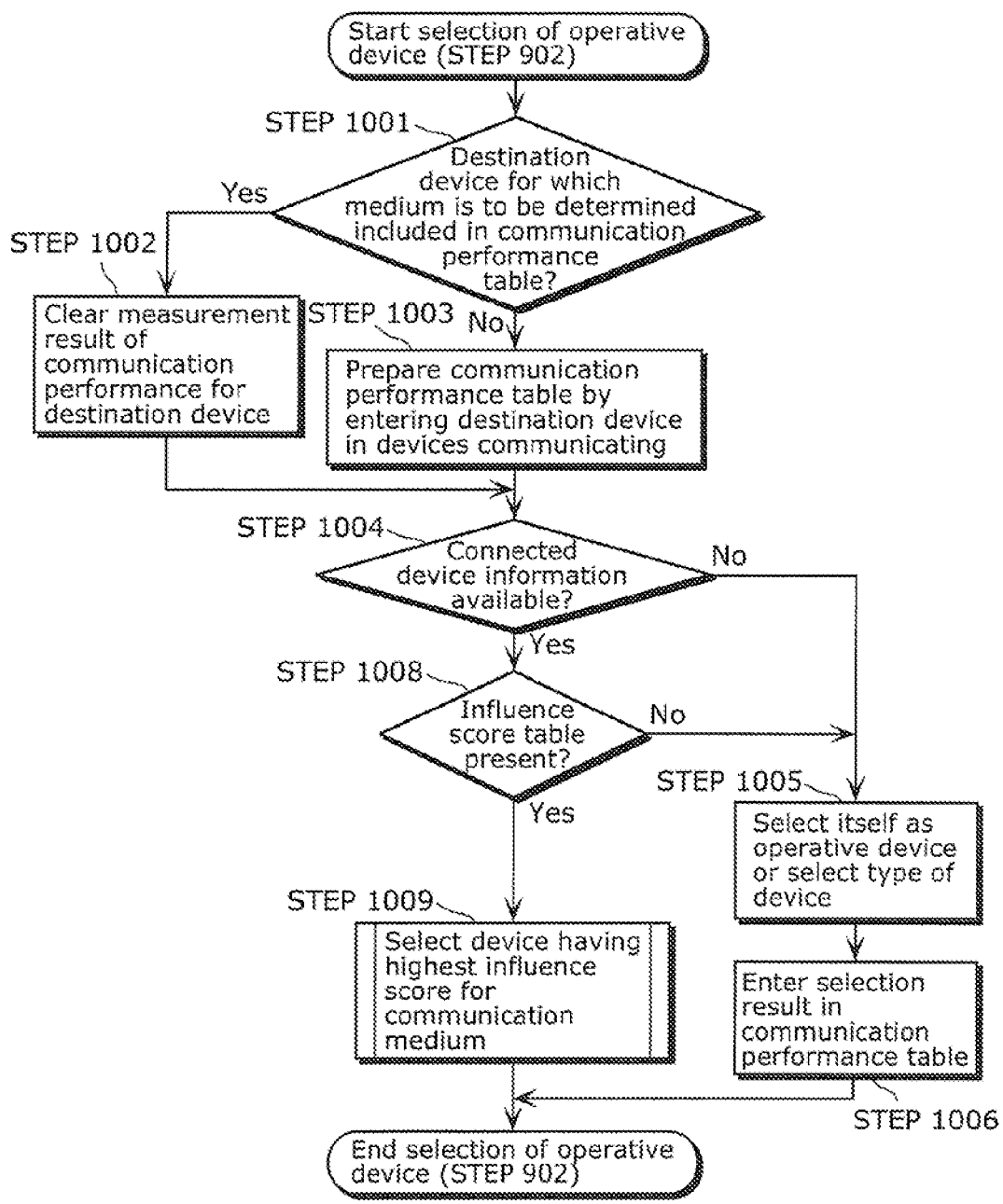
FIG. 10A is a flowchart illustrating an example of a process through which an operative device selecting unit according to Embodiment 1 selects an operative device.

FIG. 10A is a flowchart illustrating an example of a process according to Embodiment 1 through which the operative device selecting unit 302 selects an operative device. In other words, FIG. 10A is a flowchart illustrating a process through which each of the devices selects, in STEP 902 in FIG. 9, an operative device which is caused to generate noise for determination of a communication medium.

First, in STEP 1001, the operative device selecting unit 302 determines whether or not a communication medium determination destination device for which a communication medium is to be determined from now is included in the devices communicating 602 listed in the communication performance table 601.

When the operative device selecting unit 302 determines that the communication medium determination destination device is included (Yes in STEP 1001), the process proceeds to STEP 1002. In STEP 1002, the operative device selecting unit 302 clears, from the measurement results 605, data of communication performance for the communication medium determination destination device for which a communication medium is to be determined from now. The operative device selecting unit 302 may use the data in the measurement results 605 for determination of a communication medium when the data indicates a recent measurement result.

On the other hand, when the operative device selecting unit 302 determines that the communication medium determination destination device is not included (No in STEP 1001), the process proceeds to STEP 1003. In STEP 1003, the operative device selecting unit enters the communication medium determination destination device in the devices communicating 602 listed in the communication performance table 601 to prepare the communication performance table 601.

When the communication performance table 601 is ready, the process proceeds to STEP 1004. In STEP 1004, the operative device selecting unit 302 determines whether or not information on connected devices is available. Specifically, the operative device selecting unit 302 determines whether or not a connected device management table 501 is present.

Next, when the operative device selecting unit 302 determines that no connected device management table 501 is present (No in STEP 1004), the process proceeds to STEP 1005. In STEP 1005, the operative device selecting unit 302 selects, as a device to generate noise, the device including the operative device selecting unit 302 or a type of a device, because it is impossible to cause the other devices to generate noise. Then, in STEP 1006, the operative device selecting unit 302 enters the selected one in the operative devices 603 listed in the communication performance table 601.

For example, when the operative device selecting unit 302 selects a type of "plasma display panel television" in STEP 1005, the operative device selecting unit 302 enters "plasma display panel television" in the operative devices 603 in STEP 1006 even though a "plasma display panel television" is not included in the connected device management table 501 as a connected device.

When the operative device selecting unit 302 determines in STEP 1004 that a connected device management table 501 is present (Yes in STEP 1004), the process proceeds to STEP 1008.

In STEP 1008, the operative device selecting unit 302 determines whether or not an influence score table 401 is present. When the operative device selecting unit 302 determines that no influence score table 401 is present (No in STEP 1008), the process proceeds to STEP 1005. Alternatively, the operative device selecting unit 302 may inquire of another device on the network or the Internet to obtain an influence score table 401.

When the operative device selecting unit 302 determines in STEP 1008 that there is an influence score table 401 (Yes in STEP 1008), the process proceeds to STEP 1009. In STEP 1009, the operative device selecting unit 302 selects a device having the highest influence score for each of the communication media. The selection of a device having the highest influence score for a communication medium will be detailed later with reference to FIG. 11.

Thus, the operative device selecting unit 302 selects an operative device which is caused to generate noise for determination of a communication medium (STEP 902 in FIG. 9).

Figure 10B:
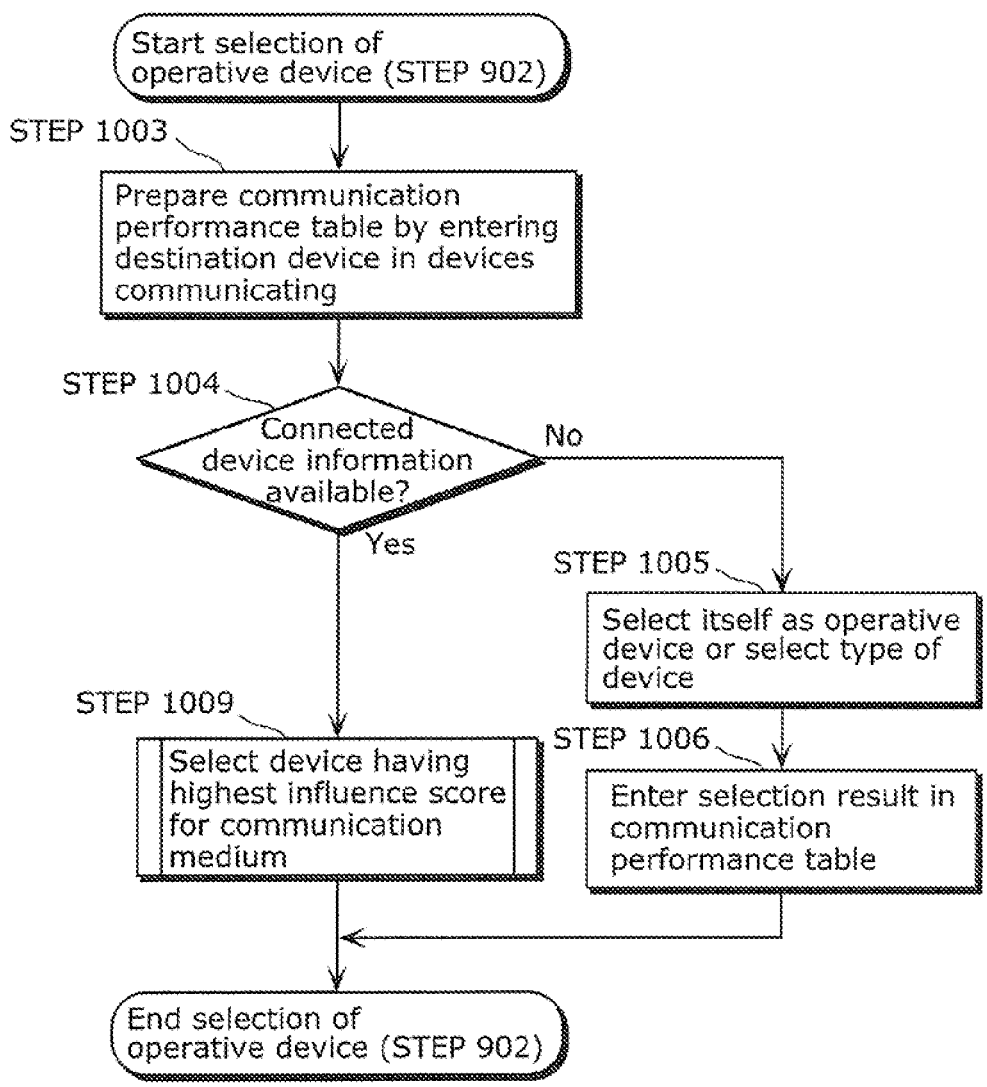
FIG. 10B is a flowchart illustrating another example of a process through which the operative device selecting unit according to Embodiment 1 selects an operative device.

Alternatively, the selection of an operative device by the operative device selecting unit 302 may skip part of the steps shown in FIG. 10A and be performed in the manner as shown in FIG. 10B. FIG. 10B is a flowchart illustrating another example of a process according to Embodiment 1 through which the operative device selecting unit 302 selects an operative device.

Specifically, as shown in FIG. 10B, skipping STEP 1001, STEP 1002, and STEP 1008 in FIG. 10A, the process may start with the STEP 1003 and proceed to STEP 1009 immediately after STEP 1004.

The following describes the process through which the operative device selecting unit 302 selects a device having the highest influence score for a communication medium (STEP 1009 in FIG. 10) in detail.

Figure 11:
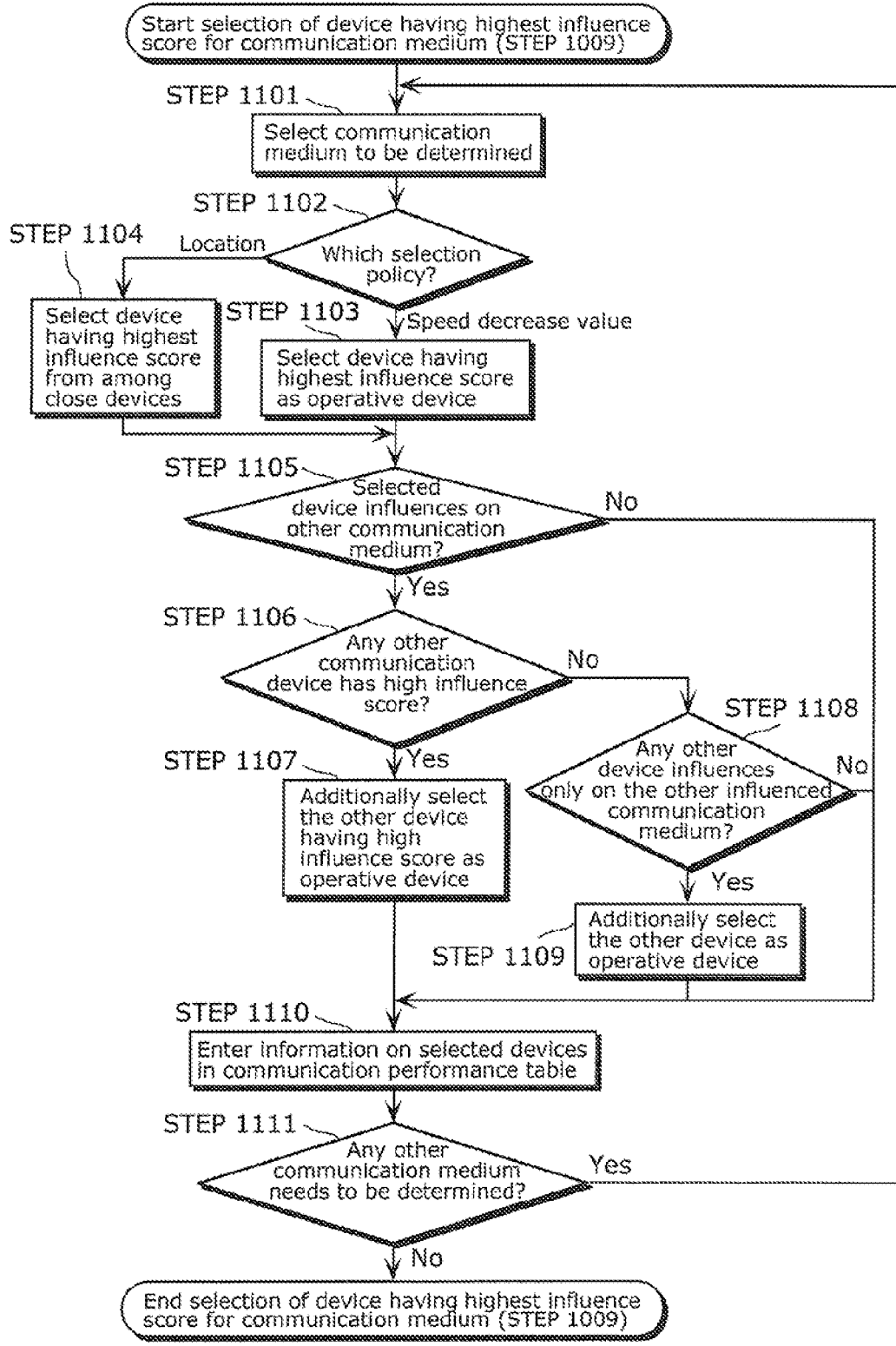
FIG. 11 is a flowchart illustrating an example of a process through which the operative device selecting unit according to Embodiment 1 selects a device which has the highest influence score for a communication medium.

FIG. 11 is a flowchart illustrating a process through which the operative device selecting unit 302 according to Embodiment 1 selects an operative device having the highest influence score for a communication medium.

First, in STEP 1101, the operative device selecting unit 302 selects, with reference to the list of the communication media 403, a first communication medium which is influenced by noise generated when a device in the influence score table 401 is activated.

Next, in STEP 1102, the operative device selecting unit 302 obtains a selection policy for determination of a device which has the highest influence score for the selected communication medium among the devices. The obtained selection policy depends on the communication medium.

For example, when the selected communication medium is radio waves for a wireless LAN, the device having the highest influence score for the communication medium is the device having the largest value among the speed decrease values 404 listed in the influence score table 401. In this case, the selection policy is "select a device having the largest speed decrease value".

In another example, when the selected communication medium is a power line for PLC, a device has a small influence on a PLC system regardless of the speed decrease value when the device is located at a place distant from the PLC system or connected to an outlet leading to a distribution board through a different power line, because noise from such a device is attenuated. In this case, the selection policy is "select a device having the largest influence score among close devices". Here, for the PLC system, "close" devices means that the devices are connected to outlets from the same circuit breaker. In the case where there is no close device (that is, there is no other device on the same branch circuit), "close" devices include a device connected to an outlets from a power line delivering power having the same phase of current as that of the PLC system.

When the selected communication medium is radio waves for a wireless LAN and the operative devices are located in a space where radio waves therebetween are blocked during wireless communication, noise from the operative devices is attenuated, and thus the influence score decreases. In this case, the selection policy is "select a device having the largest influence score among close devices". Here, for the wireless LAN, "close" devices means that the devices are located in a space where radio waves are not blocked.

Next, when the selection policy for determination of a device having the highest influence score for the selected communication medium is "select a device having the largest speed decrease value" ("Speed decrease value" in STEP 1102), the process proceeds to STEP 1103. In STEP 1103, the operative device selecting unit 302 selects a device having the largest speed decrease value 404 in the influence score table 401 among the connected devices according to the connected device management table 501.

Then, the communication performance obtaining unit 303 obtains values indicating transmission speeds for a first device, which is the device preferentially selected as a device for which a speed decrease value is relatively large among the connected devices, and the communication medium determining unit 301 determines, based on a speed decrease value and a speed difference value for the first device, whether or not communication through a given communication path is performed using a specific communication medium.

On the other hand, when the selection policy for determination of a device having the highest influence score for the selected communication medium is "select a device having the largest influence score among close devices" ("Location" in STEP 1102), the process proceeds to STEP 1104. In STEP 1104, the operative device selecting unit 302 selects a device having the largest speed decrease value 404 in the influence score table 401 among the devices connected to a power line of the same branch circuit or located in the same location as the communication medium determination destination device according to the power line branch circuits 505 or the locations 505 in the connected device management table 501 or 501a.

It is preferable to select a device having the highest influence score among the devices connected to a power line of the same branch circuit when the communication medium is a power line for a PLC system, and to select a device having the highest influence score among the devices located in the same room when the communication medium is radio waves for a wireless LAN.

Then, the communication performance obtaining unit 303 obtains values indicating transmission speeds for a third device, which is connected to the same power line of the same branch circuit as a power line included in the given communication path leads, and the communication medium determining unit 301 determines, based on a speed decrease value and a speed difference value for the third device, whether or not communication through the given communication path is performed using a power line for a PLC system, which is a specific communication medium.

Alternatively, the communication performance obtaining unit 303 obtains values indicating transmission speeds for a fourth device, which is the device located in a space where radio waves in use for wireless communication through a given communication path are not blocked. Then, the communication medium determining unit 301 determines, based on a speed decrease value and a speed difference value for the fourth device, whether or not communication through the given communication path is performed using a wireless communication network, which is a specific communication medium.

Then, in STEP 1105, the operative device selecting unit 302 determines whether or not activation of the selected device influences any communication medium other than the communication medium selected in STEP 1101.

When the operative device selecting unit 302 determines in STEP 1105 that activation of the selected device influences no communication medium other than the communication medium selected in STEP 1101 (No in STEP 1105), the process proceeds to STEP 1110.

Then, the communication performance obtaining unit 303 obtains a value indicating a transmission speed for a second device, which causes decrease in the transmission speed only in the specific communication medium when activated, and the communication medium determining unit 301 determines, based on the speed decrease value and the speed difference value for the second device, whether or not communication through the given communication path is performed using the specific communication medium.

On the other hand, when the operative device selecting unit 302 determines in STEP 1105 that activation of the selected device influences a communication medium other than the communication medium selected in STEP 1101 (Yes in STEP 1105), the process proceeds to STEP 1106.

In STEP 1106, the operative device selecting unit 302 determines whether or not any device other than the device selected in STEP 1105 has a high influence score. When the operative device selecting unit 302 determines that there is another device having a high influence score (Yes in STEP 1106), the process proceeds to STEP 1107. In STEP 1107, the operative device selecting unit 302 additionally selects the device which is not the device selected in STEP 1105 but has a high influence score.

When the operative device selecting unit 302 determines that there is no more device having a high influence score (No in STEP 1106), the process proceeds to STEP 1108.

In STEP 1108, the operative device selecting unit 302 determines whether or not there is any other device which influences only on a communication medium not selected in STEP 1101 but influenced by the device selected in STEP 1105.

When the operative device selecting unit 302 determines that there is a device which influences only on a communication medium not selected in STEP 1101 but influenced by the device selected in STEP 1105 (Yes in STEP 1108), the process proceeds to STEP 1109. In STEP 1109, the operative device selecting unit 302 additionally selects, as another operative device, the device which influences only on a communication medium not selected in STEP 1101 but influenced by the device selected in STEP 1105.

On the other hand, when the operative device selecting unit 302 determines that there is no device which influences only on a communication medium not selected in STEP 1101 but influenced by the device selected in STEP 1105 (No in STEP 1108), the process proceeds to STEP 1110.

In STEP 1110, the operative device selecting unit 302 enters the selected device(s) in the list of the operative devices 603 in the communication performance table 601. Next, in STEP 1111, the process returns to STEP 1101 when there is a communication medium to be determined other than the communication medium selected in STEP 1101. Then, in STEP 1111, the process ends when there is no communication medium to be determined other than the communication medium selected in STEP 1101.

Thus, the operative device selecting unit 302 selects a device which has the largest influence on a communication medium (STEP 1009 in FIG. 10).

The following describes a process through which each of the devices transmits a home electric device control packet (STEP 802 in FIG. 8 and STEP 905 in FIG. 9) in detail.

Figure 12:
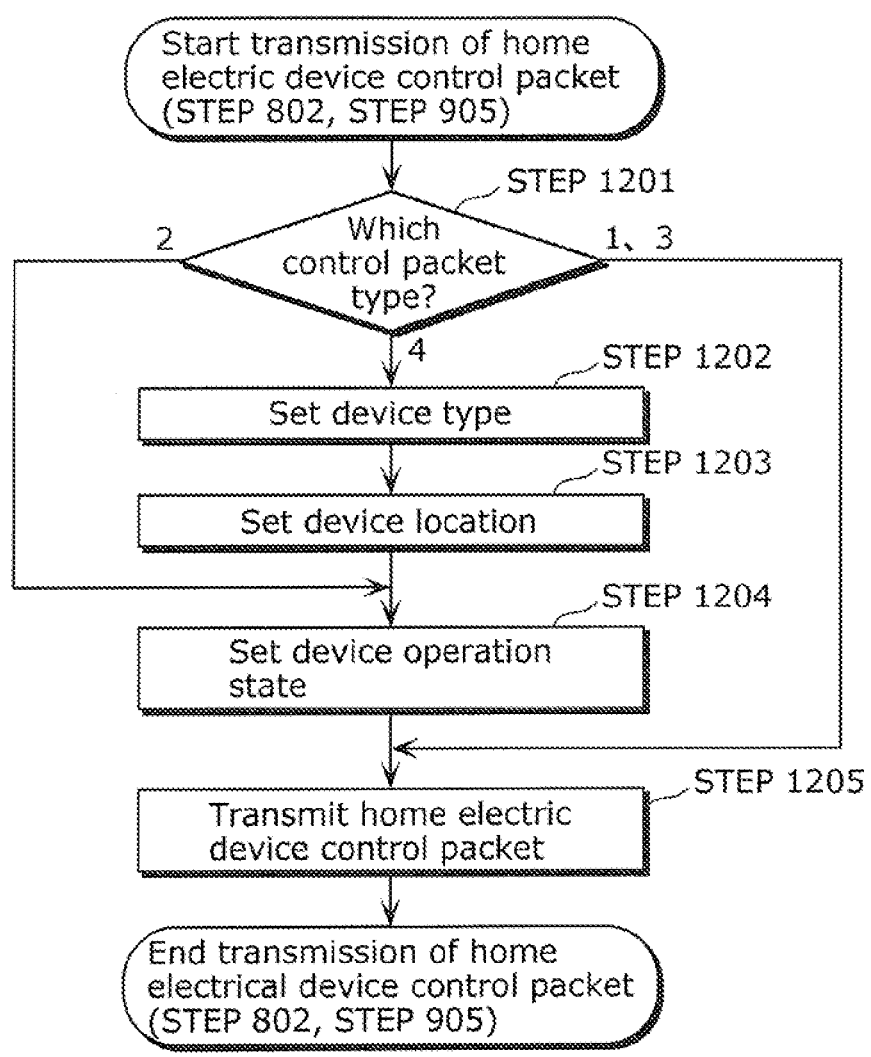
FIG. 12 is a flowchart illustrating an example of a process through which a device according to Embodiment 1 transmits a home electric device control packet.

FIG. 12 is a flowchart illustrating an example of a process through which a device according to Embodiment 1 transmits a home electric device control packet.

First, in STEP 1201, the device determines the control packet type 704 of a home electric device control packet 701 generated in the processes above. Next, when the device determines that the control packet type is "2" ("2" in STEP 1201), the process proceeds to STEP 1204. When the device determines that the control packet type is "1" or "3" ("1, 3" in STEP 1201), the process proceeds to STEP 1205. When the device determines that the control packet type is "4" ("4" in STEP 1201), the process proceeds to STEP 1202.

In STEP 1202, the device sets the device type 706 of the generated home electric device control packet to its own device type. In STEP 1203, the device sets the device location 707 of the generated home electric device control packet to its own location.

When the control packet type is "2", in STEP 1204, the device sets the device operation state 705 of the generated home electric device control packet to its own operation state after changing its own operation state in response to an operation request. On the other hand, when the control packet type is "4", in STEP 1204, the device sets the device operation state 705 of the generated home electric device control packet to its own current operation state. In STEP 1205, the device transmits the generated control packet.

Thus, each of the devices transmits a home electric device control packet (STEP 802 in FIG. 8 and STEP 905 in FIG. 9).

The following describes a process to be performed by the device control unit 304 upon receiving a home electric device control packet (STEP 907 in FIG. 9) in detail.

Figure 13:
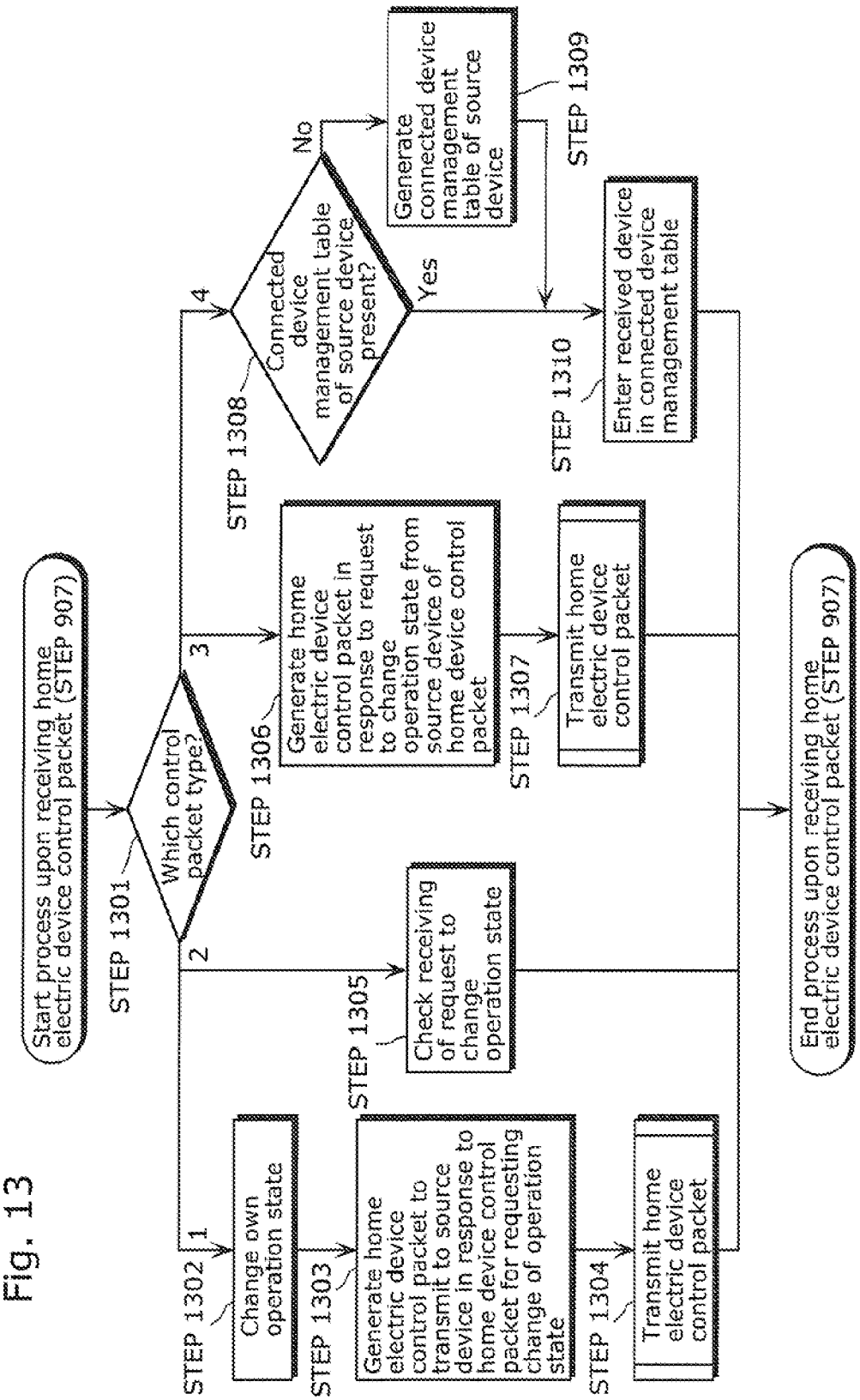
FIG. 13 is a flowchart illustrating an example of a process which a device control unit according to Embodiment 1 performs upon receiving a home electric device control packet.

FIG. 13 is a flowchart illustrating an example of the process performed by the device control unit 304 according to Embodiment 1 upon receiving a home electric device control packet.

First, in STEP 1301, the device control unit 304 determines the control packet type of the received home electric device control packet. Next, when the device control unit 304 determines that the control packet type is "2" ("2" in STEP 1301), the process proceeds to STEP 1305. When the device control unit 304 determines that the control packet type is "3" ("3" in STEP 1301), the process proceeds to STEP 1306. When the device control unit 304 determines that the control packet type is "4" ("4" in STEP 1301), the process proceeds to STEP 1308.

When the device control unit 304 determines in STEP 1301 that the control packet type of the received home electric device control packet is "1" ("1" in STEP 1301), the process proceeds to STEP 1302. In STEP 1302, the device control unit 304 changes the operation state of the device including the device control unit 304 to the device operation state 705 included in the received home electric device control packet.

Next, in STEP 1303, the device control unit 304 generates a home electric device control packet 701 for notifying the device which has transmitted the home electric device control packet having the control packet type "1" that the operation state of the device has been changed.

In addition, the device control unit 304 sets the destination device address 702 of the generated home electric device control packet to the address of the device which has transmitted the home electric device control packet having the control packet type "1", and also sets the source device address 702 of the generated home electric device control packet to the address of the device. In addition, the device control unit 304 sets the control packet type 704 of the generated home electric device control packet to "2".

Next, in STEP 1304, the device control unit 1304 transmits the generated home electric device control packet. The process of transmitting the home electric device control packet is the same as shown in FIG. 12, and the description thereof is omitted.

When the device control unit 304 determines that the control packet type is "2", the process proceeds to STEP 1305. In STEP 1305, the device control unit 304 confirms receiving of a response to an operation request from the device which has received the operation request.

When the device control unit 304 determines that the control packet type is "3", the process proceeds to STEP 1306. In STEP 1306, the device control unit 304 generates a home electric device control packet for notifying, of the state of the device, the source device of the received home electric device control packet.

In addition, the device control unit 304 sets the destination device address 702 of the generated home electric device control packet to the of the device which has transmitted the home electric device control packet having the control packet type of "3", and also sets the source device address 703 of the generated home electric device control packet to the address of the device. In addition, the device control unit 304 sets the control packet type 704 of the generated home electric device control packet to "4".

Next, in STEP 1307, the device control unit 304 transmits the generated home electric device control packet. The process of transmitting the home electric device control packet is the same as shown in FIG. 12, and the description thereof is omitted.

When the device control unit 304 determines that the control packet type is "4", the process proceeds to STEP 1308. In STEP 1308, the device control unit 304 determines whether or not a connected device management table 501 of the source device is present. When the device control unit 304 determines that a connected device management table 501 of the source device is present (Yes in STEP 1308), the process proceeds to STEP 1310.

When the device control unit 304 determines that no connected device management table 501 of the source device is present (No in STEP 1308), the process proceeds to STEP 1309. In STEP 1309, the device control unit 304 generates a connected device management table 501 of the source device.

The device control unit 304 enters the source device address 703 included in the received home electric device control packet in the list of addresses 503 in the connected device management table 501. In addition, the device control unit 304 enters the device type 706 included in the received home electric device control packet in the list of connected devices 502 in the connected device management table 501. The device control unit 304 also enters the device location 707 included in the received home electric device control packet in the list of power line branch circuits 505 in the connected device management table 501 or the list of locations 505a in the connected device management table 501a.

Next, in STEP 1310, the device control unit 304 enters the received device information in the connected device management table 501.

Thus, the device control unit 304 performs the process upon receiving a home electric device control packet (STEP 907 in FIG. 9).

The following describes determination of a specific communication medium by the communication medium determining unit 301 (STEP 913 in FIG. 9) in detail.

Figure 14:
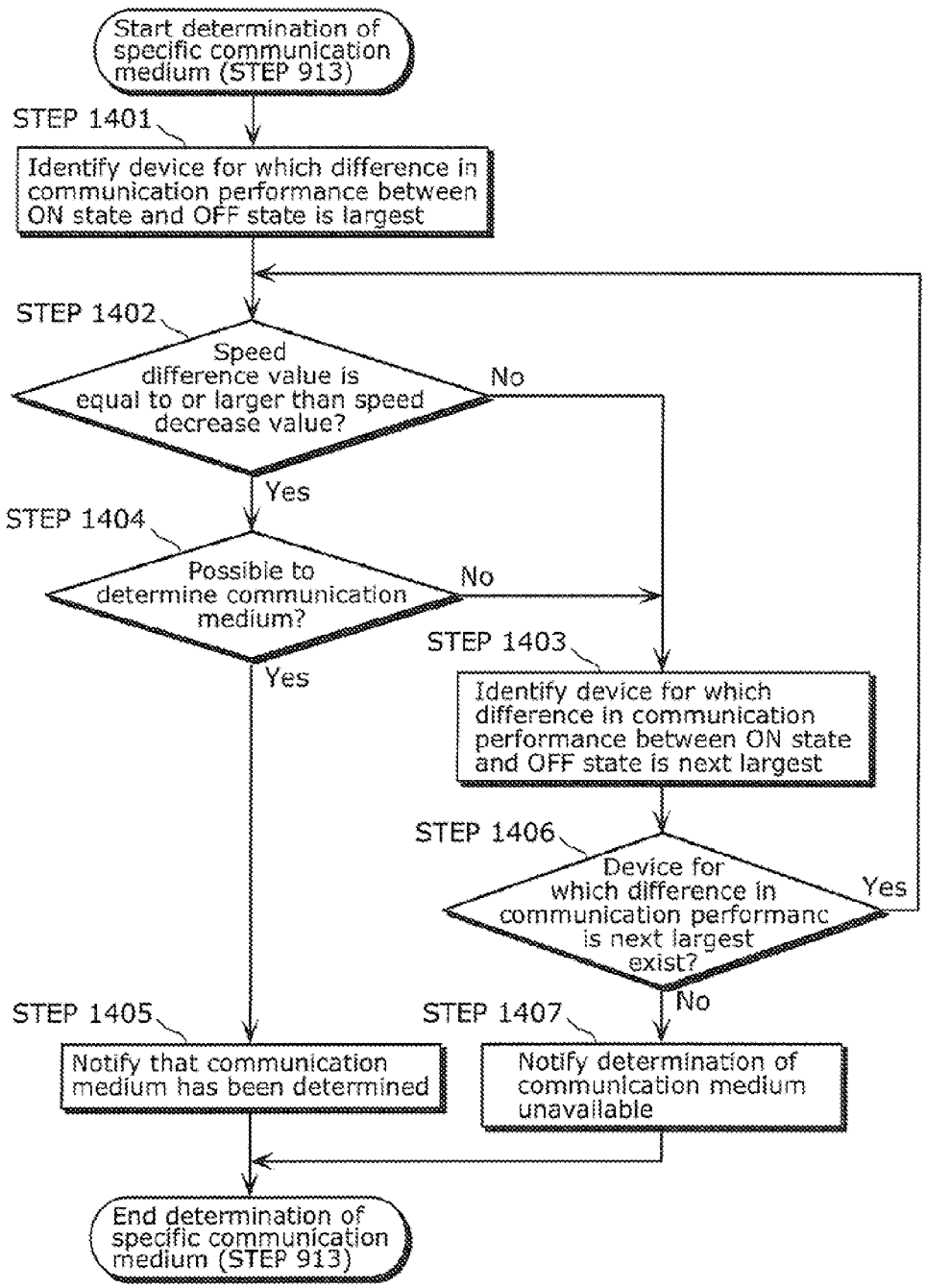
FIG. 14 is a flowchart illustrating an example of a process through which the communication medium determining unit according to Embodiment 1 determines a specific communication medium.

FIG. 14 is a flowchart illustrating an example of a process through which the communication medium determining unit 301 according to Embodiment 1 determines a specific communication medium.

First, in STEP 1401, the communication medium determining unit 301 refers to the measurement results 605 of the communication performance in the communication performance table 601, and identifies a device for which difference in communication performance is largest between when the operative device 603 is ON and when the operative device 603 is OFF.

Next, in STEP 1402, the communication medium determining unit 301 refers to the influence score table 401 and determines whether or not the speed difference value, which is the difference in communication performance on the basis of the result of the measurement, is equal to or larger than the speed decrease value of the operative device 402 which is the device for which the difference in communication performance is largest.

When the communication medium determining unit 301 determines in STEP 1402 that the speed difference value, that is, the difference in communication performance on the basis of the result of the measurement is smaller than the speed decrease value (No in STEP 1402), the process proceeds to STEP 1403.

When the communication medium determining unit 301 determines in STEP 1402 that the speed difference value, that is, the difference in communication performance on the basis of the result of the measurement is equal to or larger than the speed decrease value (Yes in STEP 1402), the process proceeds to STEP 1404. In STEP 1404, the communication medium determining unit 301 determines whether or not it is possible to determine a communication medium.

It is impossible for the communication medium determining unit 301 to determine a communication medium when the speed difference value is equal to or larger than the speed decrease values for a plurality of communication media. The process therefore proceeds to STEP 1403. In STEP 1403, the communication medium determining unit 301 evaluates difference in communication performance due to influence of other devices on communication media.

On the other hand, it is possible for the communication medium determining unit 301 to determine a communication medium when the speed difference value is equal to or larger than the speed decrease value for only one communication medium. In this case, it is determined that only one communication is influenced, and the process proceeds to STEP 1405. In STEP 1405, the communication medium determining unit 301 notifies the device requesting the determination of a communication medium that a communication medium has been determined.

In STEP 1403, the communication medium determining unit 301 identifies a device for which difference in communication performance between when the operative device 603 is ON and when the operative device 603 is OFF is next largest.

Next, in STEP 1406, the communication medium determining unit 301 determines whether or not there is a device identified as the device for which difference in communication performance is next largest. When the communication medium determining unit 301 determines that there is a device identified as the device for which difference in communication performance is next largest (Yes in STEP 1406), the process proceeds to STEP 1402.

On the other hand, when the communication medium determining unit 301 determines that there is not a device for which difference in communication performance is next largest (No in STEP 1406), the process proceeds to STEP 1407. In STEP 1407, the communication medium determining unit 301 notifies the device requesting the determination of a communication medium that the determination of a communication medium is not available.

Thus, the communication medium determining unit 301 determines a communication medium (STEP 913 in FIG. 9).

In this manner, according to Embodiment 1, when it is desired to determine a communication medium between devices communicating with each other, communication performance between the devices is measured when a device which generates noise having influence on communication medium to be determined is generating noise and when the device is not generating noise, and then a determination is made as to whether or not there is difference in the communication performance. In this configuration, a communication medium used between the devices communicating with each other may be determined even when a communication medium is changed to another communication medium at an adapter between the devices.

The influence score table includes a threshold for difference in communication performance between when each of the devices on the influence score table is generating noise and when the device is not generating noise. In this configuration, communication performance is measured when an operative device is generating noise and when the operative device is not generating noise and difference in the communication performance is obtained. The obtained difference in the communication performance is thus precisely identified as difference due to change in communication environment or as difference due to influence of noise from the operative device by determining whether or not the difference is larger than the threshold in the influence score table. Therefore, accuracy of determination of a communication medium is increased.

In other words, whether or not communication through a given communication path is performed using a specific communication medium is determined based on (i) a speed decrease value of the specific communication medium due to the activation of an operative device and (ii) a speed difference value between when the operative device is active and when the operative device is inactive. In this configuration, a communication medium used in the given communication path may be determined based on the speed decrease value and the speed difference value even when the communication medium in use is radio waves or a power line for PLC. For example, a communication medium used in a communication path may be determined even when a communication medium is changed to a power line at an adapter on the communication path. A communication medium in used for communication between two devices on a network is thus easily determined even when a PLC system or wireless LANs using different frequency bands are used for the communication.

Furthermore, upon issuance of an activation instruction to an operative device, a value indicating a transmission speed is obtained when the operative device is active, and upon issuance of a deactivation instruction to the operative device, a value indicating a transmission speed is obtained when the operative device is inactive. Thus, an activation instruction and a deactivation instruction are issued to an operative device so that values indicating transmission speeds of a given communication path may be obtained when the operative device is active and when the operative device is inactive. In this configuration, a speed difference value is easily obtained.

Furthermore, it is determined that the communication through the given communication path is performed using a specific communication medium when the speed difference value is equal to or larger than the speed decrease value. In other words, a communication medium may be easily determined by such an easy operation of comparing a speed difference value and a speed decrease value.

Furthermore, a device having a high influence score may be selected for each communication medium with reference to influence score tables prepared for respective communication media. Therefore, a communication medium in use may be determined among different communication media. For example, operative devices which have influence on respective communication media, that is, radio waves and a power line, are selected, and difference in communication performance between when the operative device is active and when the operative device is inactive is measured for each of the selected operative devices. When the difference in communication performance exceeds a threshold only for one of the selected devices, it is determined that the communication medium in use is the one influenced by the noise from the device for which the difference exceeds a threshold.

Furthermore, communication performance of a communication medium to be determined for devices communicating with each other is measured when an operative device having the largest influence on a communication medium possibly used as the communication medium. In this configuration, communication performance measured when the operative device is active is noticeably different from communication performance measured when the operative device is inactive. Therefore, accuracy of determination of a communication medium is increased.

In other words, a device for which a speed decrease value is relatively large is preferentially selected as a first device from among devices, and values indicating transmission speeds for the first device are obtained. Then, whether or not communication through a given communication path is performed using a specific communication medium is determined based on a speed decrease value and a speed difference value for the first device. With this, a device having a relatively large influence for each communication medium may be preferentially selected by preferentially selecting a device for which a speed decrease value is relatively large for a communication medium. Therefore, accuracy of determination of a communication medium is increased.

Furthermore, a device selected as an operative device does not simultaneously influence two or more of the communication media which are possibly used in communication between the devices communicating with each other. In this configuration, a communication medium may be determined by measuring communication performance only once.

In other words, values indicating transmission speeds for a second device which causes decrease in the transmission speed only in a specific communication medium are obtained. Then, whether or not communication through a given communication path is performed using a specific communication medium is determined based on a speed decrease value and a speed difference value for the second device. Thus, a device which causes decrease in transmission speed only in a specific communication medium is selected. Therefore, whether or not the specific communication medium is used may be determined with high accuracy through a single determination.

Furthermore, devices to which an instruction for noise generation can be issued are managed using the device list in which devices connected to the communication medium determining apparatus is listed. This produces an effect of saving useless issuance of an activation instruction to a device not connected to the communication medium determining apparatus.

Furthermore, an unavailable device which is present but unplugged may be also included in the list when a state of power supply is checked in addition to device types. Furthermore, communication performance for a device in the ON state may be measured without an explicit activation instruction, with reference to a device operation state included in the list to determine whether or not the device is active as soon as device information is obtained. Furthermore, whether or not a device is located where noise generated by the device is active there is likely have influence may be determined with reference to the information of device locations.

Furthermore, when whether or not a communication medium between devices communicating with each other is a power line for PLC is determined, noise necessary for the determination may be caused by activating a device located in a space where noise generated by the device there is most likely to be influential, with reference to the information on a circuit breaker.

Furthermore, when whether or not a communication medium between devices communicating with each other is a power line for PLC is determined, a device connected to the same circuit breaker as devices communicating with each other, especially a device receiving data, is selected as an operative device. This makes the communication medium to be determined subject to influence of noise due to the operative device in ON state, so that difference in communication performance becomes more noticeable.

In other words, values indicating transmission speeds for a third device, which is connected to a power line of the same branch circuit as a power line included in a given communication path connects are obtained. Then, whether or not communication through the given communication path is performed using a power line for PLC is determined based on a speed decrease value and a speed difference value for the third device. With this, when whether or not a communication medium included in a given communication path is a power line is determined, a device having a large influence on PLC may be selected by selecting a device connected to a power line of the same branch circuit. For example, the power lines of the same branch circuit share the same circuit breaker. Therefore, whether or not a PLC system is used may be accurately determined.

Furthermore, values indicating transmission speeds for a fourth device, which is located in a space where radio waves in use for wireless communication through a given communication path are not blocked, are obtained. Then, whether or not communication through the given communication path is performed using a wireless communication network is determined based on a speed decrease value and a speed difference value for the fourth device. With this, when whether or not a communication medium included in a given communication path is radio waves for a wireless LAN is determined, a device which has a large influence on a wireless LAN may be selected by selecting a device located in a space where radio waves are not blocked. Therefore, whether or not a wireless LAN is used may be accurately determined.

Furthermore, a device may obtain a value indicating a transmission speed by performing a measurement for itself in communication through a given communication path or may obtain a value indicating a transmission speed from another device which has performed communication through the given communication path. With this, the device may obtain a value indicating a transmission speed by performing a measurement for itself, and may obtain a value indicating the transmission speed from another device when the device does not measure a value indicating a transmission speed for the device itself.

It is to be noted that a device which is plugged to an outlet and activated may decrease communication performance of PLC, and plasma display panel televisions, cleaners, and dryers are typical devices which greatly decreases communication performance of PLC when operating. In addition, microwave ovens are typical devices which decrease communication performance of a 2.4-GHz wireless LAN, and plasma display panel televisions and PCs are typical devices which decrease communication performance of a 900-MHz wireless LAN.

It is also to be noted that a communication medium determining apparatus is not necessarily one of the devices communicating with each other through a communication medium to be determined. A communication medium determining apparatus may determine a communication medium between devices communicating with each other upon a request from another communication medium determining apparatus on the same network, and may measure communication performance upon a request from outside of the home network, such as from a customer support center.

Embodiment 2

The following describes Embodiment 2. In Embodiment 1, in order to determine a communication medium between devices, the operation state of a connected device which is not communicating through the communication medium is switched between ON and OFF. It is therefore necessary to turn a device ON which should not be turned ON unless a communication medium needs to be determined. For example, an image may be suddenly displayed on a plasma display panel television which has been off.

In contrast, in Embodiment 2, operation states of connected devices are monitored, so that it is unnecessary to turn on a device only for determination of a communication medium. Specifically, the operation state of a device is monitored and communication performance is measured when the device is active and when the device is inactive. Then, a communication medium between devices is determined from difference in the measured communication performance without activating another device.

More specifically, a home electric device control apparatus monitors all the connected devices and identifies the operation states of the devices. The identified states of the devices are notified to the connected devices. Notified of the ON and OFF states of a device selected as a device be caused to generate noise for determination of a communication medium, a communication medium determining apparatus measures communication performance when the device is ON and when the device is OFF. As a result, activation of a device only for generation of noise is avoided.

The following describes Embodiment 2 with reference to the drawings.

Figure 15:
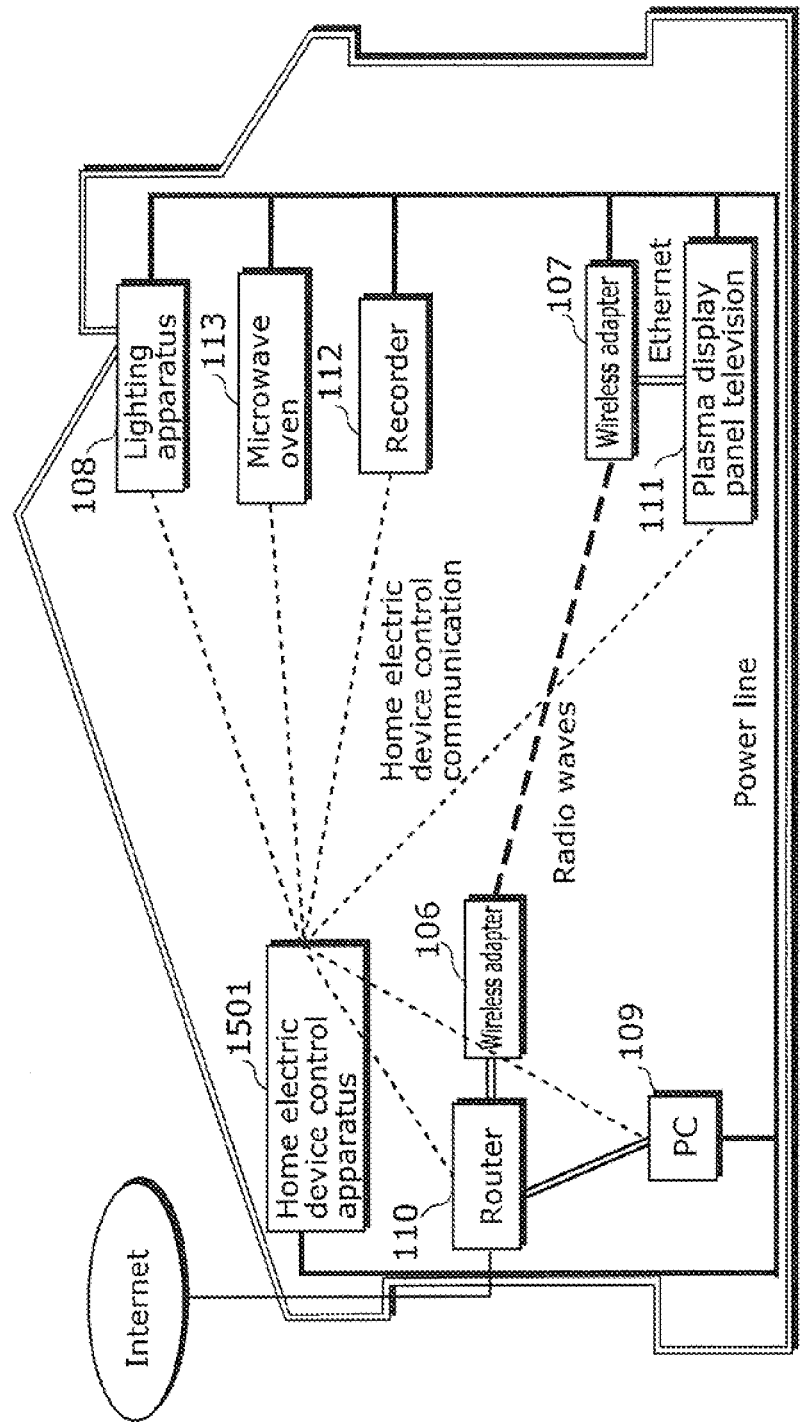
FIG. 15 illustrates a network configuration according to Embodiment 2.

FIG. 15 illustrates a configuration of a network according to Embodiment 2. In FIG. 15, home electric devices are connected to a home electric device control apparatus 1501 in a wireless home electric device control system (Home electric device control communication in FIG. 15). The home electric device control apparatus 1501 and the home electric devices may be connected not through a wireless LAN but with a wired LAN.

The home electric device control apparatus 1501 identifies operation states ON and OFF of the respective home electric device in real time. The home electric devices inquire of the home electric device control apparatus 1501 about the operation states of other home electric devices, and the home electric device control apparatus 1501 notifies the home electric devices of the states. In other words, in Embodiment 2, the home electric device control apparatus 1501 functions as a communication medium determining apparatus which determines a communication medium in use for communication through a given communication path.

Figure 16:
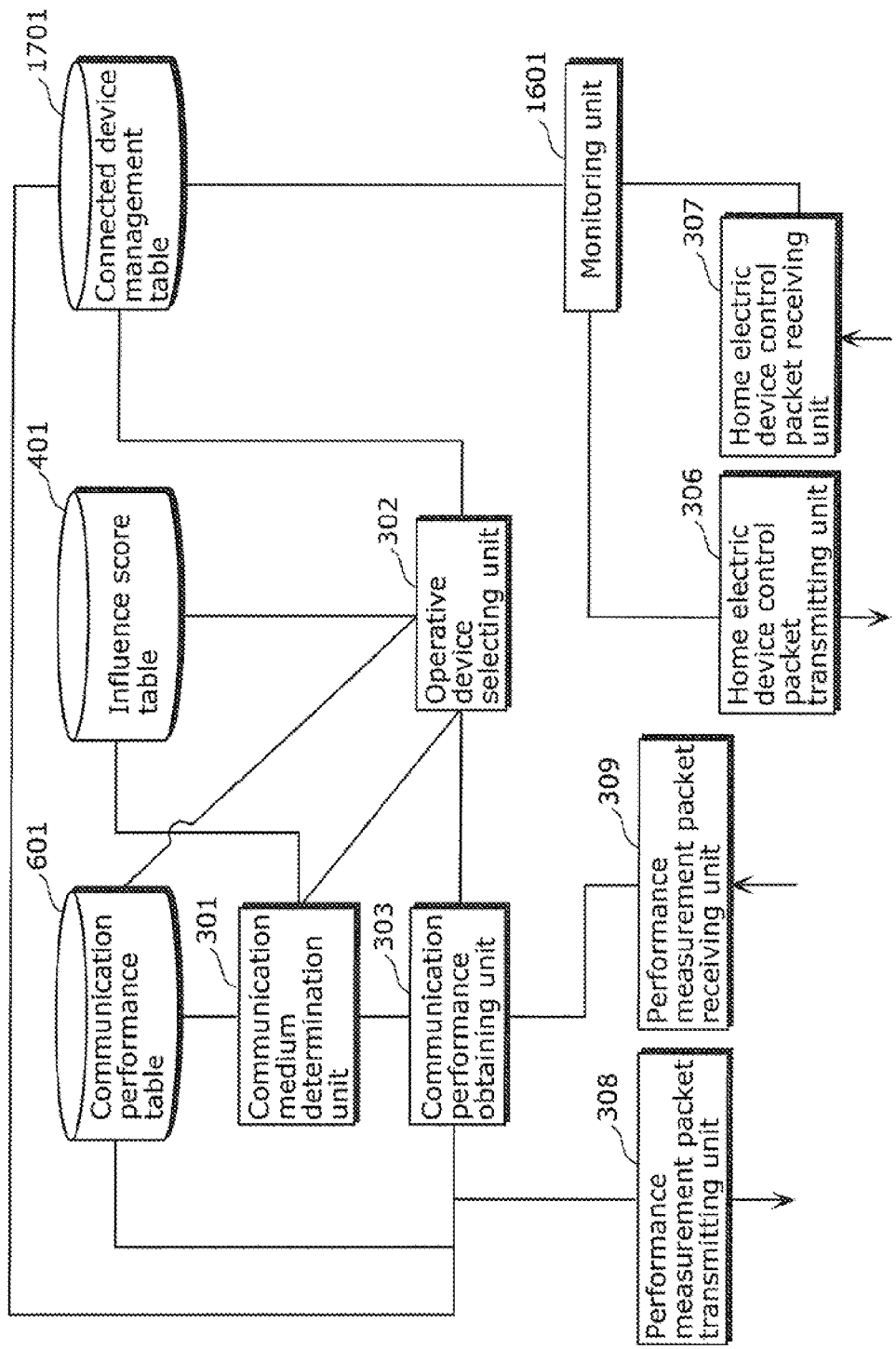
FIG. 16 shows a block diagram illustrating a functional configuration of the home electric device control apparatus which functions as a communication medium determining apparatus according to Embodiment 2.

FIG. 16 shows a block diagram illustrating a functional configuration of the home electric device control apparatus 1501 which functions as a communication medium determining apparatus according to Embodiment 2. Specifically, FIG. 16 is a functional block diagram illustrating functions performed by the CPU 202 of the home electric device control apparatus 1501. In FIG. 16, the functional blocks illustrated also in the functional block diagram in FIG. 3 are denoted with the same reference numerals as in FIG. 3. The following describes differences from FIG. 3.

A connected device management table 1701 is a data table containing identification information for identifying connected devices in association with the operation states of the connected devices. The connected device management table 1701 is stored in a memory 201 of the home electric device control apparatus 1501. The connected device management table 1701 will be described later.

A monitoring unit 1601 obtains operation states which indicate whether the respective connected devices are active or inactive. In addition, the monitoring unit 1601 updates the connected device management table 1701 by storing, in the memory 201, the obtained operation states of the connected devices in association with the identification information of the connected devices.

The communication performance obtaining unit 303 obtains values indicating transmission speeds of a given communication path when a connected device is active and when the connected device is inactive, with reference to the operation states obtained by the monitoring unit 1601. In other words, the communication performance obtaining unit 303 obtains values indicating the transmission speeds with reference to the operation states of the connected devices included in the connected device management table 1701.

Specifically, the monitoring unit 1601 has a function of identifying the operation states of the respective devices in addition to the functions of the connected device managing unit 305 shown in FIG. 3. In order to identify the operation states of the connected devices in real time, the monitoring unit 1601 regularly generates home electric device control packets 701 having a control packet type of "3" for the connected devices and requests the home electric device control packet transmitting unit 306 to transmit the generated home electric device control packets to the connected devices.

In addition, upon receiving a home electric device control packet having a control packet type of "3" from the home electric device control packet receiving unit 307, the monitoring unit 1601 generates a home electric device control packet 701 having a control packet type of "4", and enters its own operation state, ON or OFF, in the device operation state 705, and then requests the home electric device control packet transmitting unit 306 to transmit the generated home electric device control packet 701 in return.

In addition, upon receiving a home electric device control packet having a control packet type of "4" from the home electric device control packet receiving unit 307, the monitoring unit 1601 enters the content of the packet in the connected device management table 1701 stored in the memory 201.

Here, each of the devices may generate a home electric device control packet having a control packet type of "4" and request the home electric device control packet transmitting unit 306 to transmit the home electric device control packet to the home electric device control apparatus 1501 only when the operation state of the device changes. Optionally, in order to notify change of its own operation state when selected as an operative device, each of the devices may generate a home electric device control packet of a control packet type of "4" and transmit the home electric device control packet to the home electric device control apparatus 1501 which is determining a communication medium.

FIG. 17 illustrates an example of the connected device management table 1701 according to Embodiment 2.

Referring to FIG. 17, connected device operation states 1702 of the connected devices are listed in addition to the content of the connected device management table 501 in FIG. 6. In other words, the connected device management table 1701 includes connected devices 502 and the connected device operation states 1702 in association with each other. The connected devices 502 are identification information for identifying connected devices. The connected device operation states 1702 are the operation states of the connected devices.

Each entry of the connected device operation states 1702 indicates ON or OFF which is a device operation state 705 included in the received home electric device control packet 701 having a control packet type of "4".

Figure 18:
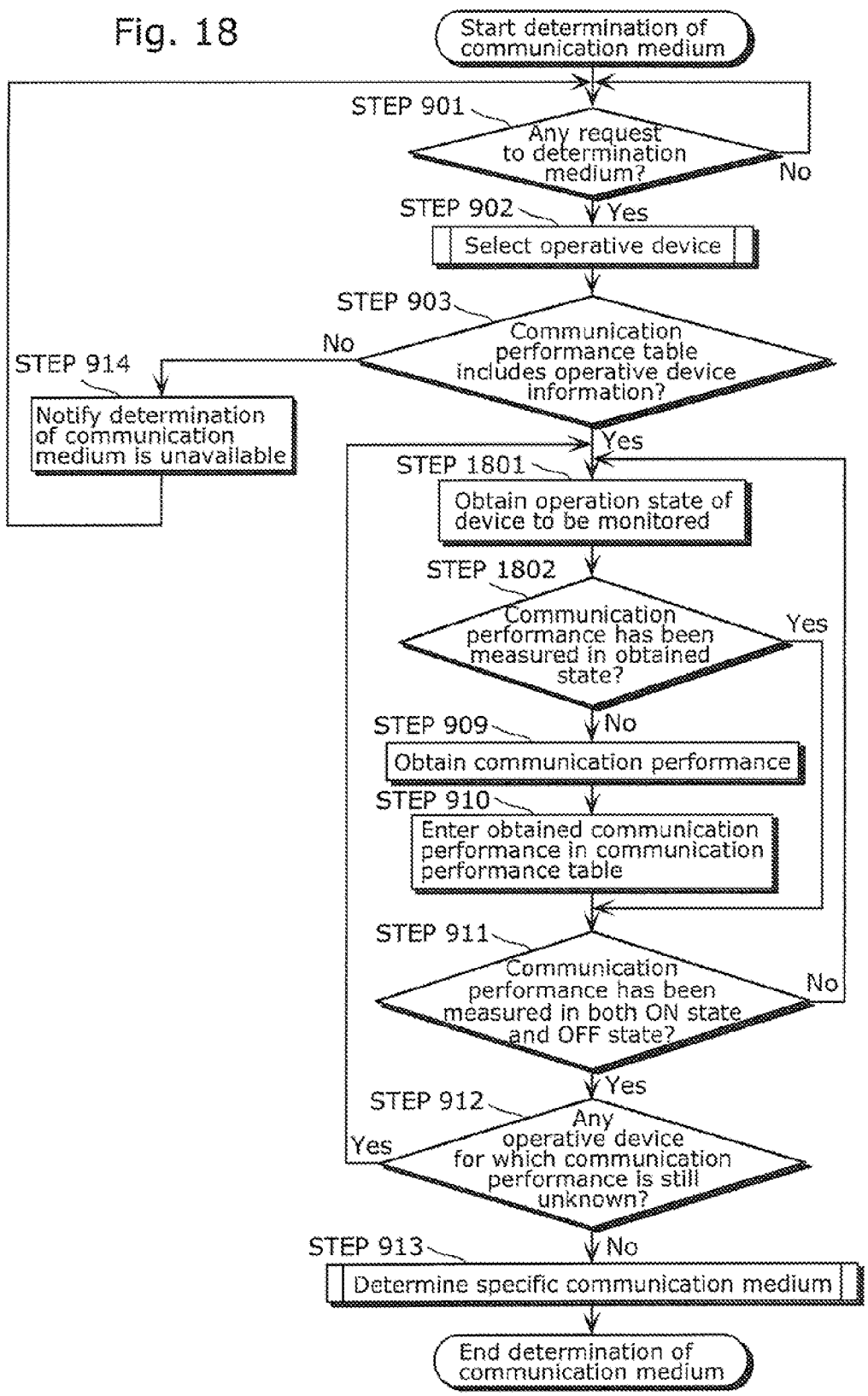
FIG. 18 is a flowchart illustrating an example of a process through which the home electric device control apparatus which functions as the communication medium determining apparatus according to Embodiment 2 determines a communication medium.

The following describes internal control of the devices and the home electric device control apparatus 1501 with reference to FIG. 18.

FIG. 18 is a flowchart illustrating a process through which the home electric device control apparatus 1501 which functions as a communication medium determining apparatus according to Embodiment 2 determines a communication medium. In FIG. 18, the steps also in the process according to Embodiment 1 shown in FIG. 9 are denoted with the same reference numerals as in FIG. 9. The following describes differences from FIG. 9.

In STEP 903, when it is determined that an operative device is included in the communication performance table 601 (Yes in STEP 903), the process proceeds to STEP 1801. In STEP 1801, the monitoring unit 1601 selects one of the operative devices 603 listed in the communication performance table 601, and obtains a connected device operation state 1702 of the selected device from the connected device management table 1701.

Next, in STEP 1802, the communication performance obtaining unit 303 determines whether or not communication performance has been measured for the selected device in the obtained connected device operation state. When the communication performance obtaining unit 303 determines that communication performance has not been measured for the selected device in the obtained connected device operation state (No in STEP 1802), the process proceeds to STEP 909. In STEP 909, the communication performance obtaining unit 303 obtains a value indicating a transmission speed as communication performance.

On the other hand, when the communication performance obtaining unit 303 has determined that communication performance has been measured for the selected device in the obtained connected device operation state (Yes in STEP 1802), the process proceeds to STEP 911. In STEP 911, the communication performance obtaining unit 303 determines whether or not communication performance has been obtained both for the ON state and the OFF state of the device selected in STEP 1801.

When the communication performance obtaining unit 303 determines that communication performance lacks a measurement result for one of the ON state and the OFF state of the selected device (No in STEP 911), the process returns to STEP 1801. In STEP 1801, the monitoring unit 1601 waits for the connected device operation state of the selected device to change. Also when the communication performance obtaining unit 303 determines that there is a device for which the communication performance has not been obtained (Yes in STEP 912), the process returns to STEP 1801. In STEP 1801, the monitoring unit 1601 waits for the connected device operation state of the selected device to change.

Thus, the home electric device control apparatus 1501 determines a communication medium.

As illustrated above, in Embodiment 2, the operation state of the device selected as the one which needs to change the operation status for determination of a communication medium is monitored. As a result, it is unnecessary to cause the device selected as an operative device to change the operation status. In other words, operation of a device is monitored so that communication performance may be measured when the monitor is active and when the device is inactive. In this configuration, a communication medium between devices may be determined without activating or deactivating the operative device under an instruction from the communication medium determining apparatus.

In addition, the communication performance obtaining unit 303 measures communication performance when the operative device is active and when the operative device is inactive, with reference to the operation state of the operative device of the connected device management table 1701. In this configuration, a communication medium between devices may be determined without activating or deactivating the operative device under an instruction from the communication medium determining apparatus.

In other words, the operation state of an operative device is obtained, and a value indicating a transmission speed in a given communication path is obtained with reference to the obtained operation state, for each of the case where the device is active and the case where the device is inactive. In this configuration, a speed difference value may be easily obtained without activating or deactivating the operative device, and thereby a communication medium through which two devices on a network are communicating with each other may be easily determined.

In addition, the operation state of the connected device is stored in association with identification information of a connected device, and transmission speeds of a given communication path are obtained when the connected device is active and when the connected device is inactive, with reference to the stored operation state of the connected device. In this configuration, a speed difference value may be easily obtained using the stored information without activating or deactivating the operative device, and thereby a communication medium through which two devices on a network are communicating with each other may be easily determined.

Although the home electric device control apparatus 1501 illustrated above identifies operation states of all the devices, it is also possible in Embodiment 2 that a connected device notifies the home electric device control apparatus 1501 of the change of its own device operation state by directly transmitting a home electric device control packet or that the home electric device control apparatus 1501 transmits a home electric device control packet requesting a connected device to notify its operation state.

Embodiment 3

The following describes Embodiment 3. In Embodiment 1 and Embodiment 2, a device which causes noise having influence on a communication medium between devices is activated or deactivated in order to determine the communication medium. However, when there is a device for which a communication medium in use has been already known, a communication medium may be determined by determining whether or not network congestion occurs in a communication medium to be determined when the known communication medium is used for communication by the device. The following describes Embodiment 3 in which a communication medium is determined even without a device that generates noise.

The following describes Embodiment 3 with reference to the drawings.

Figure 19:
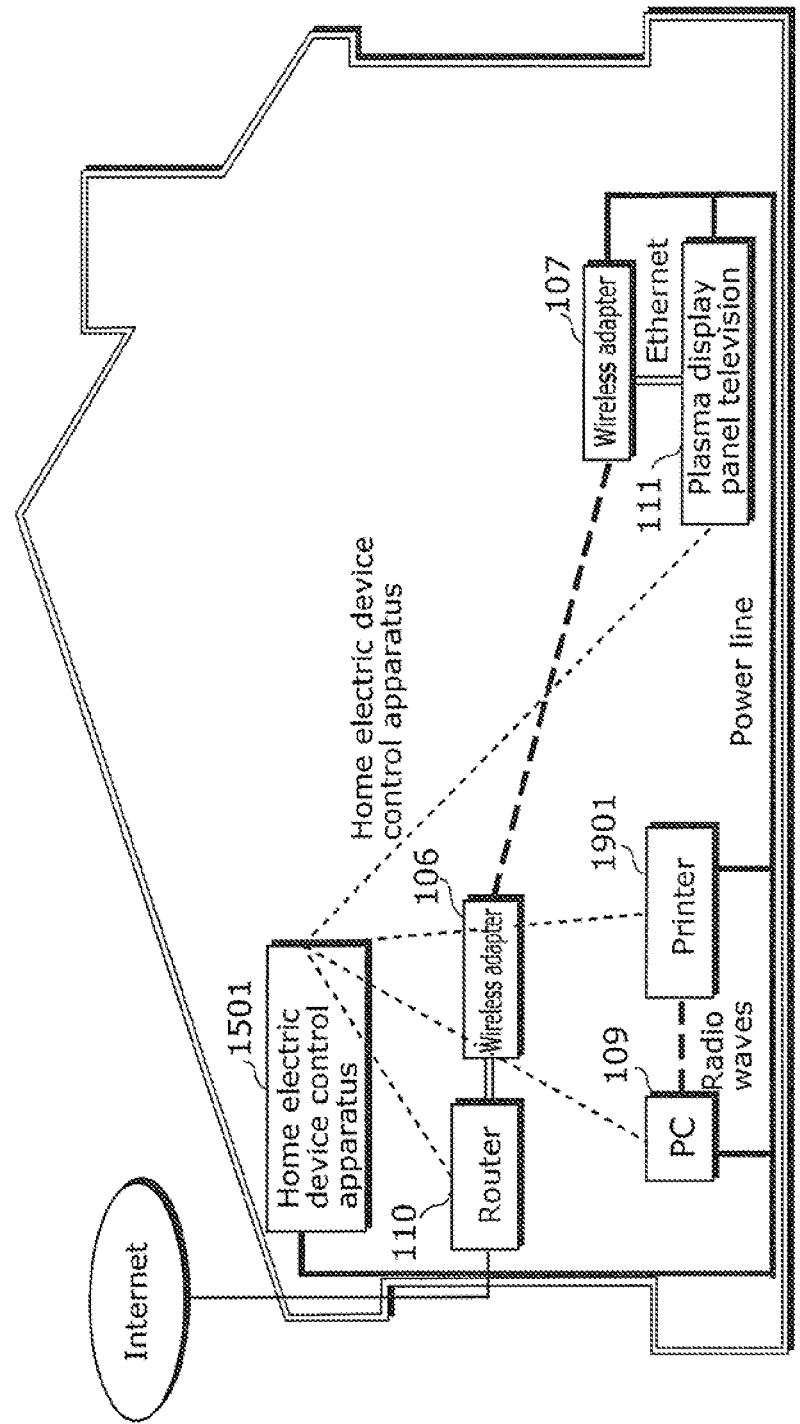
FIG. 19 illustrates a network configuration according to Embodiment 3.

FIG. 19 illustrates a configuration of a network according to Embodiment 3.

In FIG. 19, the devices illustrated also in FIG. 1 and FIG. 15 are denoted with the same reference numerals as in FIG. 1 and FIG. 15. The following describes differences from FIG. 1 or FIG. 15.

As shown in FIG. 19, a printer 1901 is present. It is known that the printer 1901 communicates with the PC 109 through a wireless LAN of 2.4-GHz frequency band.

A block diagram shown in FIG. 16 illustrating a functional configuration of the home electric device control apparatus 1501 which functions as a communication medium determining apparatus is also applicable to Embodiment 3, and therefore description thereof is not omitted.

FIG. 20 illustrates an example of the connected device management table 2001 according to Embodiment 3.

Referring to FIG. 20, communication media 2002 and communication medium operation states 2003 are listed in addition to the content of the connected device management table 501 shown in FIG. 6. The communication media 2002 are media through which the respective connected devices communicate with the other connected devices through their own known communication interfaces. The communication medium operation states 2003 indicate whether or not communication is currently performed through the respective communication media 2002.

It is to be noted that the communication currently performed through the respective communication media is not the home electric device control communication between the home electric device control apparatus 1501 and each of the home electric devices shown in FIG. 19 but the communication between the home electric devices.

Figure 21:
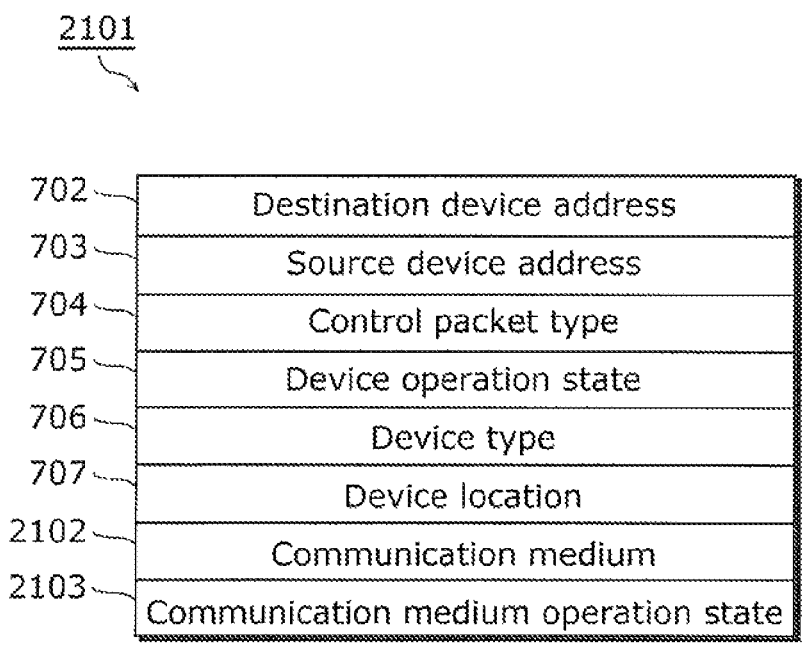
FIG. 21 illustrates a data format of a home electric device control packet according to Embodiment 3.

FIG. 21 illustrates a data format of the home electric device control packet 2101 according to Embodiment 3 flowing across the network for control of a device. In FIG. 21, the fields also in FIG. 7 are denoted with the same reference numerals as in FIG. 7. The following describes only differences from FIG. 7.

A field of device communication medium 2102 indicates a communication medium through which the device which generates the home electric device control packet 2101 communicates through their own known communication interfaces. The field of communication medium operation state 2103 indicates the operation state of the device communication medium 2102 by ON and OFF.

The monitoring unit 1601 has functions equivalent to the functions of the monitoring unit 1601 according to Embodiment 2 shown in FIG. 16. Upon receiving a home electric device control packet 2101 having a control packet type of "3" from the home electric device control packet receiving unit 307, the monitoring unit 1601 generates a home electric device control packet 2101 having a control packet type of "4" in order to notify its own state.

The monitoring unit 1601 enters not only its own current operation state (ON or OFF) in the device operation state 705 but also, if available, a known communication medium in use in the device control medium 2102, and the operation state of the device control medium 2102 in the communication medium operation state 2103, and then requests the home electric device control packet transmitting unit 306 to transmit the generated home electric device control packet 2101.

In addition, upon receiving a home electric device control packet 2101 having a control packet type of "4" from the home electric device control packet receiving unit 307, the monitoring unit 1601 enters the content of the packet in the connected device management table 2001 stored in the memory 201. Specifically, the monitoring unit 1601 enters the device communication medium 2102 included in the received home electric device control packet 2101 in the communication medium 2002 of the connected device management table 2001, and the communication medium operation state 2103 included in the received home electric device control packet 2101 in the communication medium operation state 2003.

Figure 22:
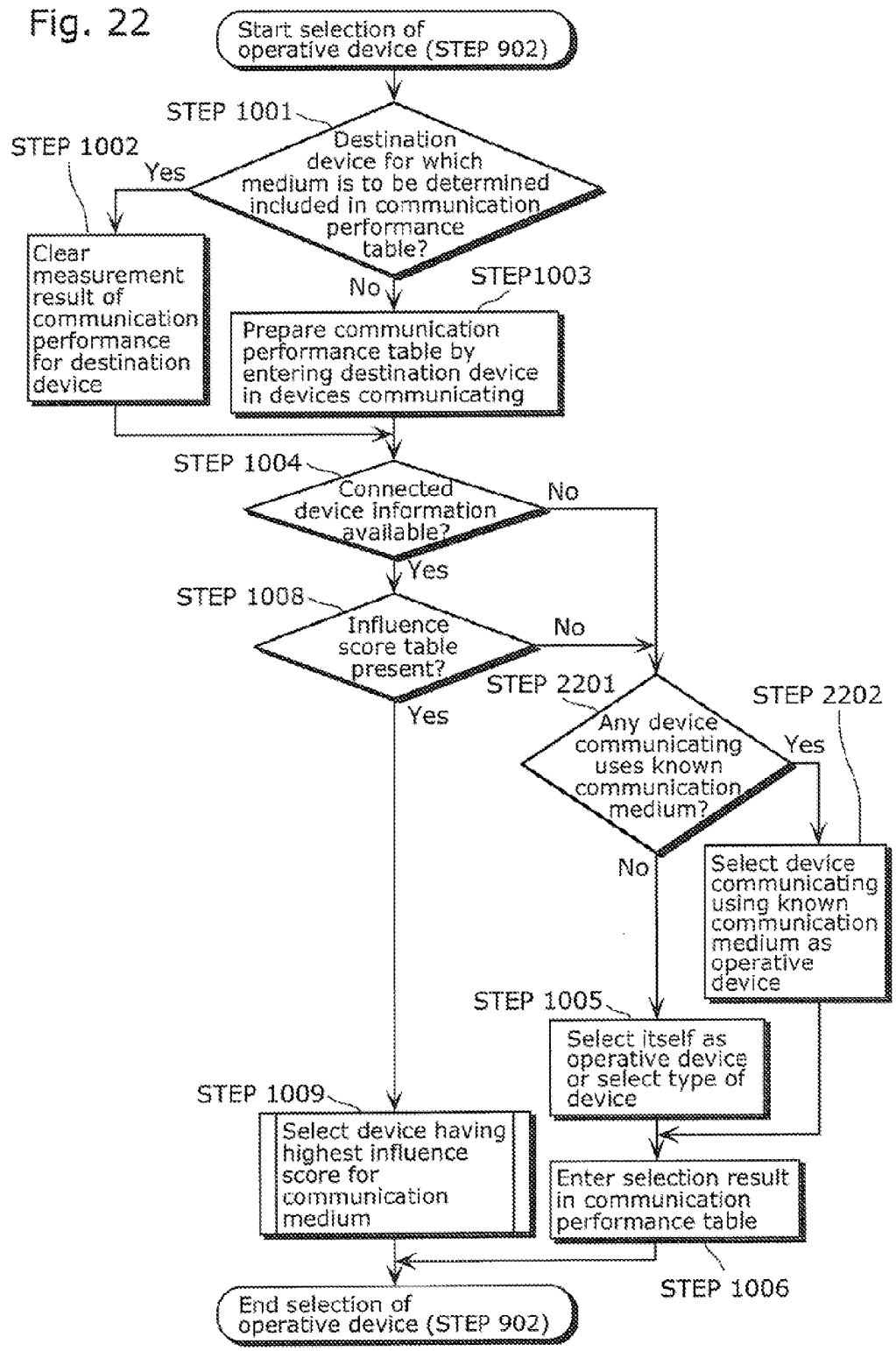
FIG. 22 is a flowchart illustrating an example of a process through which a monitoring unit according to Embodiment 3 selects an operative device.
Figure 23:
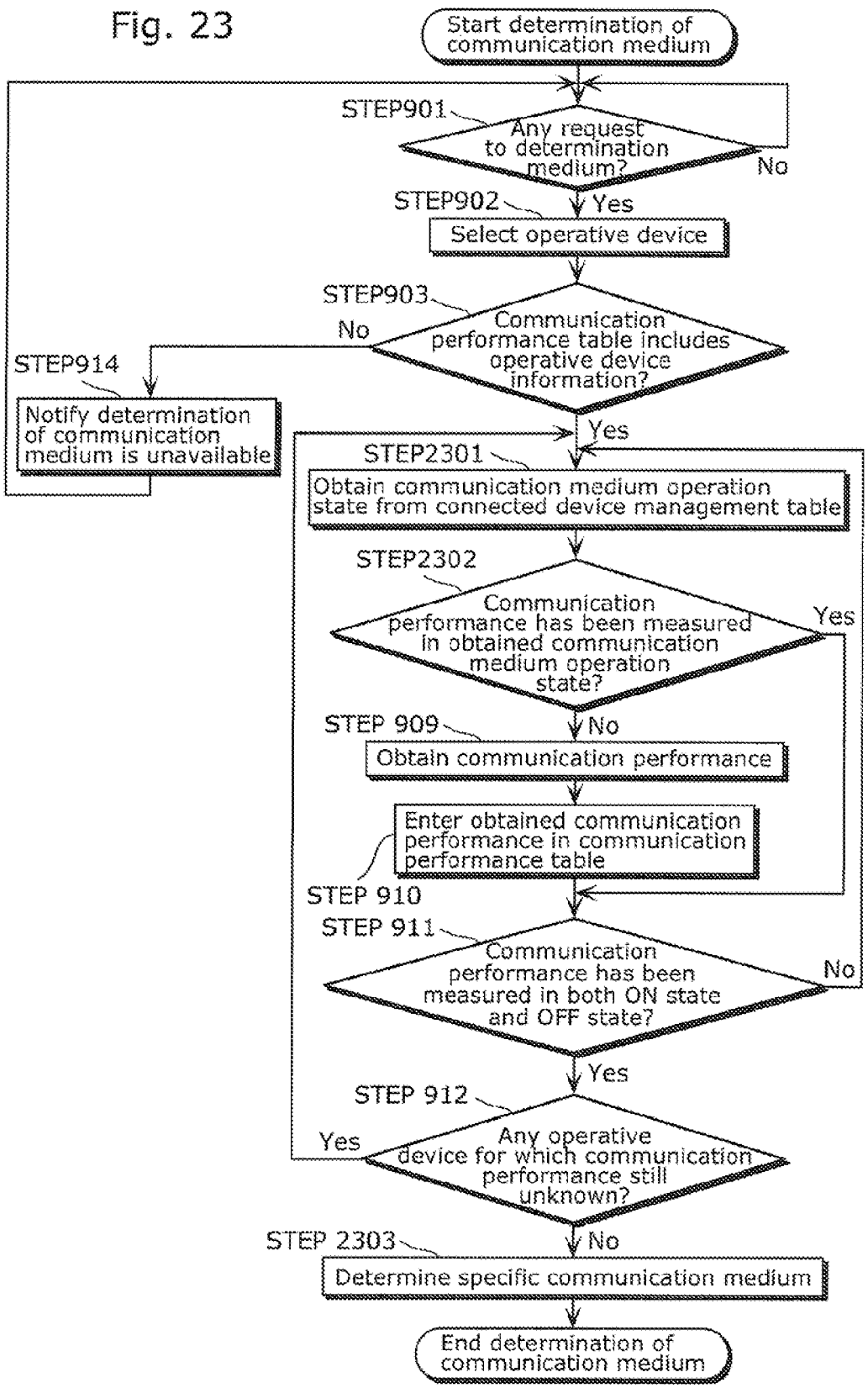
FIG. 23 is a flowchart illustrating an example of a process through which a home electric device control apparatus functioning as a communication medium determining apparatus according to Embodiment 3 determines a communication medium.

The following describes internal control of the devices, the home electric device control apparatus 1501, and the printer 1901 with reference to FIG. 22 and FIG. 23.

FIG. 22 is a flowchart illustrating a process according to Embodiment 3 through which the monitoring unit 1601 selects an operative device. In FIG. 22, the steps in the selection of an operative device illustrated also in FIG. 10A are denoted with the same reference numerals as in FIG. 10A. The following describes differences from FIG. 10A.

When the monitoring unit 1601 determines that no connected device is available for generation of noise for determination of a communication medium (No in STEP 1004) or that no influence score table 401 is present (No in STEP 1008), the process proceeds to STEP 2201. In STEP 2201, the monitoring unit 1601 determines whether or not there is any device which communicates using a known communication medium, with reference to the connected device management table 2001.

When the monitoring unit 1601 determines that there is a device which communicates using a known communication medium (Yes in STEP 2201), the process proceeds to STEP 2202. In STEP 2201, the monitoring unit 1601 selects one device for each of the communication media and enters the selected devices in the operative devices 603 of the communication performance table 601. In addition, the monitoring unit 1601 enters ON or OFF in the operation states 606. Then, the process proceeds to STEP 1006.

On the other hand, when the monitoring unit 1601 determines that there is no device which communicates using a known communication medium (No in STEP 2201), the process proceeds to STEP 1005.

Thus, the monitoring unit 1601 selects an operative device.

FIG. 23 is a flowchart illustrating a process through which the home electric device control apparatus 1501 which functions as a communication medium determining apparatus according to Embodiment 3 determines a communication medium. In FIG. 23, the steps illustrated also in FIG. 9 are denoted with the same reference numerals as in FIG. 9. The following describes differences from FIG. 9.

When it is determined that an operative device is included in the communication performance table 601 (Yes in STEP 903), the process proceeds to STEP 2301. In STEP 2301, the monitoring unit 1601 selects one of the operative devices 603 listed in the communication performance table 601, and obtains a communication medium operation state 2003 of the selected device from the connected device management table 2001.

Next, the process proceeds to STEP 2302. In STEP 2302, the monitoring unit 1601 determines whether or not communication performance has been measured for the selected device in the obtained communication medium operation state.

When the monitoring unit 1601 determines that communication performance has not been measured for the selected device in the obtained communication medium operation state (No in STEP 2302), the process proceeds to STEP 909. In STEP 909, the communication performance obtaining unit 303 obtains a value indicating a transmission speed as communication performance.

On the other hand, when the monitoring unit 1601 has determined that communication performance has been measured for the selected device in the obtained communication medium operation state (Yes in STEP 2302), the process proceeds to STEP 911. In STEP 911, the monitoring unit 1601 determines whether or not communication performance has been obtained both for the ON state and the OFF state of the device selected in STEP 2301.

When the monitoring unit 1601 determines that communication performance lacks a measurement result for one of the ON state and the OFF state of the selected device (No in STEP 911), the process returns to STEP 2301. In STEP 2301, the monitoring unit 1601 waits for the communication medium operation state of the selected device to change. Also when the monitoring unit 1601 determines that there is a device for which the communication performance has not been obtained (Yes in STEP 912), the process returns to STEP 1801. In STEP 1801, the monitoring unit 1601 waits for the communication medium operation state of the selected device to change.

When the monitoring unit 1601 determines that the communication performance has been obtained for all the devices (No in STEP 912), the process returns to STEP 2303. In STEP 2303, the communication medium determining unit 301 determines a specific communication medium.

Specifically, when communication performance is lower when the operation state of a specific communication medium is ON than when the operation state of the specific communication medium is OFF, the communication medium determining unit 301 determines that the communication is performed using the specific communication medium. More specifically, when a value indicating a transmission speed in a given communication path in the case where the specific communication medium is active is smaller than a value indicating a transmission speed in the given communication path in the case where the specific communication medium is inactive, the communication medium determining unit 301 determines that communication through the given communication path is performed using the specific communication medium.

Thus, the home electric device control apparatus 1501 determines a communication medium.

It is to be noted the functions of the home electric device control apparatus 1501 disclosed in Embodiment 3 may be included in each of the home electric devices. The home electric device control apparatus 1501 may regularly notify each of the home electric devices on the network of the operation states of the other home electric devices even without any inquiry from the home electric device.

In this manner, in Embodiment 3, communication media used by connected devices for communication are managed by the connected device management table 2001. In this configuration, a device which actually uses a communication medium possibly used by devices communicating with each other is selected as an operative device even when there is no available information on an operative device for a communication medium possibly in use for communication between the devices communicating with each other. The selected device is caused to perform communication during measurement of communication performance. Then, the communication medium may be determined by determining whether or not communication performance through the devices communicating with each other is lower when the selected device is performing communication than when the selected device is not performing communication.

In addition, communication media used by connected devices for communication and the operation states of the communication media are managed by the connected device management table 2001. In this configuration, a device which actually uses a communication medium possibly used by devices communicating with each other is selected as an operative device even when there is no available information on a device which generates noise, when it is active, to a communication medium possibly in use for communication between the devices communicating with each other. A communication medium may be determined by determining whether or not there is difference in communication performance between when the operative device is performing communication and generating noise and when the operative device is not performing communication and generating no noise.

The present invention relating to a communication medium determining apparatus has been thus described on the basis of the embodiments but not limited to the embodiments.

It should be understood that these embodiments are given for illustrative purposes in all aspects and not restrictive. The scope of the present invention is indicated not by the description above but by the claims, and is intended to include any modification within the scope and the sense of equivalents of the claims. The scope of the present invention also includes configurations in which the components in Embodiment 1 to 3 are optionally combined.

Figure 24:
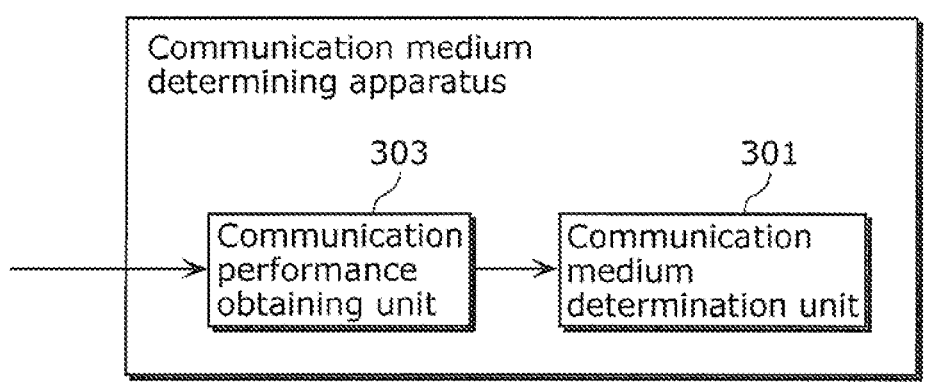
FIG. 24 shows a block diagram illustrating a functional configuration of a communication medium determining apparatus according to a modification of the embodiments.
Figure 25:
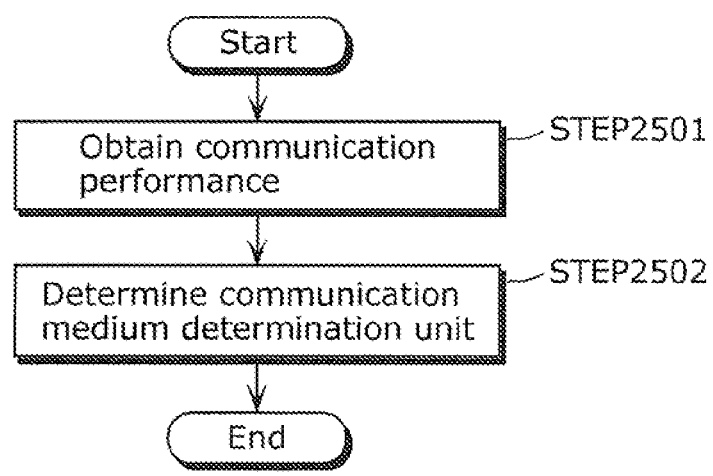
FIG. 25 is a flowchart illustrating an example of a process through which the communication medium determining apparatus according to the modification of the embodiments determines a communication medium.

For example, a communication medium determining apparatus according to the present invention is not limited to the configuration shown in FIG. 3 or FIG. 16 but may include only the communication performance obtaining unit 303 and the communication medium determining unit 301 as shown in FIG. 24. FIG. 24 shows a block diagram illustrating a functional configuration of a communication medium determining apparatus according to a modification of the embodiments. Specifically, as shown in FIG. 25, the communication performance obtaining unit 303 obtains values indicating transmission speeds as communication performance (STEP 2501). Then, the communication medium determining unit 301 determines whether or not communication through a given communication path is performed using a specific communication medium, based on a speed decrease value and a speed difference value which is obtained from the values obtained by the communication performance obtaining unit 303 (STEP 2502). The present invention can be implemented also in this configuration. FIG. 25 is a flowchart illustrating a process through which the communication medium determining apparatus in the modification of the embodiments determines a communication medium.

In the above embodiments, the influence score table, the connected device management table, and the communication performance table are stored in the memory, and the processing units of the communication medium determining apparatus perform processes with reference to the tables. However, the processing units of the communication medium determining apparatus may perform the processes without reference to the tables, and the tables may not be stored in the memory.

Furthermore, the present invention may be implemented not only as such a communication medium determining apparatus but also as a method including the processes of the processing units performed by the communication medium determining apparatus as steps. The present invention may be implemented also as a program which causes a, computer to perform the characteristic processes included in the method. It should be understood that the program may be distributed via a storage medium such as a CD-ROM or a transmission medium such as the Internet.

Furthermore, the functional blocks included in the embodiments of the present invention and the modification thereof disclosed above may be implemented as a large-scale integration (LSI) which is an integrated circuit. For example, they may be implemented as an integrated circuit including the communication performance obtaining unit 303 and the communication medium determining unit 301 shown in FIG. 24. These functional blocks may be integrated into separate single chips, or some or all of the functional blocks may be integrated into a single chip. The integrated circuit described as an LSI above may be referred to as an IC, a system LSI, a super LSI or an ultra LSI, depending on the degree of integration.

The method of forming integrated circuitry is not limited to use of an LSI. Dedicated circuitry or a general-purpose processor may be used instead of an LSI. Also applicable are a field programmable gate array (FPGA), which allows post-manufacture programming, and a reconfigurable processor LSI, which allows post-manufacture reconfiguration of connection and setting of circuit cells therein. Furthermore, the present invention may be implemented using a configuration in which hardware resources includes a processor and a memory and the processer executes a control program stored in a read-only memory (ROM).

Furthermore, in the event that an advance in or derivation from semiconductor technology brings about an integrated circuitry technology whereby an LSI is replaced, functional blocks may be obviously integrated using such new technology. The adaptation of biotechnology or the like is possible.

INDUSTRIAL APPLICABILITY

According to the present invention, a determination is made as to whether or not difference in communication performance between when noise is generated and when no noise is generated is equal to or larger than a threshold. This allows a determination as to whether or not a specific communication medium is included in a communication path between devices communicating with each other. Thus, a configuration of a network may be remotely determined even when the network includes not only a wireless LAN but also a PLC system. Therefore, the present invention is applicable as a communication medium determining apparatus and a method of determining a communication medium, offering a technique for determination of a network configuration. This is one of the techniques which allow users to easily and conveniently set up network-connected home electric devices and have precise advice from a call center.

REFERENCE SIGNS LIST 101, 102, 103, 104 PLC adapter
105 Distribution board
106, 107 Wireless adapter
108 Lighting apparatus
109 PC
110 Router
111 Plasma display panel television
112 Recorder
113 Microwave oven
201 Memory
202 CPU
203 Network interface
301 Communication medium determining unit
302 Operative device selecting unit
303 Communication performance obtaining unit
304 Device control unit
305 Connected device managing unit
306 Home electric device control packet transmitting unit
307 Home electric device control packet receiving unit
308 Performance measurement packet transmitting unit
309 Performance measurement packet receiving unit
401 Influence score table
402 Operative device
403 Communication medium
404 to 407 Speed decrease value
501, 501a, 1701, 2001 Connected device management table
502 Connected device
503 Address
505 Power line branch circuit
505a Location
601 Communication performance table
602 Devices communicating
603 Operative device
604 Communication medium
605 Measurement result
606 Operation state
701, 2101 Home electric device control packet
702 Destination device address
703 Source device address
704 Control packet type
705 Device operation state
706 Device type
707 Device location
1501 Home electric device control apparatus
1601 Monitoring unit
1702 Connected device operation state
1901 Printer
2002 Communication medium
2003 Communication medium operation state
2102 Device communication medium
2103 Communication medium operation state

The invention claimed is:

1. A communication medium determining apparatus which determines a communication medium in use for communication through a given communication path, said communication medium determining apparatus comprising:
   a communication performance obtaining unit configured to obtain (i) a value indicating a transmission speed in the given communication path when a device is active and (ii) a value indicating a transmission speed in the given communication path when the device is inactive, the device being a cause of decrease in transmission speed in a specific communication medium when the device is activated; and
   a communication medium determining unit configured to determine whether or not the communication through the given communication path is performed using the specific communication medium, based on (i) a speed decrease value indicating an amount of decrease in the transmission speed in the specific communication medium caused by activation of the device and (ii) a speed difference value which is a difference between the transmission speed obtained by said communication performance obtaining unit when the device is active and the transmission speed obtained when the device is inactive.

2. The communication medium determining apparatus according to claim 1, further comprising
   a device control unit configured to issue an activation instruction or a deactivation instruction to the device,
   wherein said communication performance obtaining unit is configured to obtain the transmission speed when the device is active upon issuance of the activation instruction to the device by said device control unit, and configured to obtain the transmission speed when the device is inactive upon issuance of the deactivation instruction to the device by said device control unit.

3. The communication medium determining apparatus according to claim 1, further comprising
   a monitoring unit configured to obtain an operation state indicating whether the device is active or inactive,
   wherein said communication performance obtaining unit is configured to obtain the value indicating the transmission speed when the device is active or when the device is inactive, with reference to the operation state obtained by said monitoring unit.

4. The communication medium determining apparatus according to claim 3, further comprising
   a storage unit in which identification information for identifying the device and the operation state of the device are stored in association with each other,
   wherein said monitoring unit is configured to store, in said storage unit, the obtained operation state of the device in association with the identification information of the device, and
   said communication performance obtaining unit is configured to obtain the value indicating the transmission speed, with reference to the operation state of the device stored in said storage unit.

5. The communication medium determining apparatus according to claim 1,
   wherein said communication medium determining unit is configured to determine that the communication through the given communication path is performed using the specific communication medium, when the speed difference value is equal to or larger than the speed decrease value.

6. The communication medium determining apparatus according to claim 1,
   wherein said communication performance obtaining unit is configured to obtain the values indicating the transmission speeds for a first device preferentially selected from among devices including the device, each of the devices being a cause of decrease in the transmission speed in the specific communication medium when the device is activated, and the first device being a device for which the speed decrease value is relatively large, and
   said communication medium determining unit is configured to determine whether or not the communication through the given communication path is performed using the specific communication medium, based on the speed decrease value for the first device and the speed difference value for the first device.

7. The communication medium determining apparatus according to claim 1,
   wherein said communication performance obtaining unit is configured to obtain the values indicating the transmission speeds for a second device which is the device and causes decrease in the transmission speed only in the specific communication medium when the device is activated, and
   said communication medium determining unit is configured to determine whether or not the communication through the given communication path is performed using the specific communication medium, based on the speed decrease value for the second device and the speed difference value for the second device.

8. The communication medium determining apparatus according to claim 1,
   wherein said communication performance obtaining unit is configured to obtain the values indicating the transmission speeds for a third device which is the device and is connected to a power line of a same branch circuit as a power line included in the given communication path, and
   said communication medium determining unit is configured to determine, based on the speed decrease value for the third device and the speed difference value for the third device, whether or not the communication through the given communication path is performed using a power line for power line communication, which is the specific communication medium.

9. The communication medium determining apparatus according to claim 1,
   wherein said communication performance obtaining unit is configured to obtain the values indicating the transmission speeds for a fourth device which is the device and is located in a space where radio waves in use for wireless communication through the given communication path are not blocked, and
   said communication medium determining unit is configured to determine, based on the speed decrease value for the fourth device and the speed difference value for the fourth device, whether or not the communication through the given communication path is performed using a wireless communication network, which is the specific communication medium.

10. The communication medium determining apparatus according to claim 1,
    wherein said communication performance obtaining unit is configured to obtain at least one of the values indicating the transmission speeds, by performing a measurement in communication through the given communication path or by receiving from an other device which has performed communication through the given communication path.

11. A method of determining a communication medium in use for communication through a given communication path, said method comprising:

obtaining (i) a value indicating a transmission speed in the given communication path when a device is active and (ii) a value indicating a transmission speed in the given communication path when the device is inactive, the device being a cause of decrease in transmission speed in a specific communication medium when the device is activated; and determining whether or not the communication through the given communication path is performed using the specific communication medium, based on (i) a speed decrease value indicating an amount of decrease in the transmission speed in the specific communication medium caused by activation of the device and (ii) a speed difference value which is a difference between the transmission speed obtained in said obtaining when the device is active and the transmission speed obtained in said obtaining when the device is inactive.

12. An integrated circuit which determines a communication medium in use for communication through a given communication path, said integrated circuit comprising:

a communication performance obtaining unit configured to obtain (i) a value indicating a transmission speed in the given communication path when a device is active and (ii) a value indicating a transmission speed in the given communication path when the device is inactive, the device being a cause of decrease in transmission speed in a specific communication medium when the device is activated; and a communication medium determining unit configured to determine whether or not the communication through the given communication path is performed using the specific communication medium, based on (i) a speed decrease value indicating an amount of decrease in the transmission speed in the specific communication medium caused by activation of the device and (ii) a speed difference value which is a difference between the transmission speed obtained by said communication performance obtaining unit when the device is active and the transmission speed obtained when the device is inactive.

* * * * *